United States Patent [19]

Noguchi et al.

[11] Patent Number: 5,083,357

[45] Date of Patent: Jan. 28, 1992

[54] METHOD OF AND APPARATUS FOR ASSEMBLING DOOR HANDLE

[75] Inventors: Hiroyuki Noguchi; Darrell Stofford; Lewis Sandridge, all of Marysville, Ohio

[73] Assignee: Honda Giken Kogyo Kabushiki Kaisha, Tokyo, Japan

[21] Appl. No.: 542,078

[22] Filed: Jun. 22, 1990

Related U.S. Application Data

[62] Division of Ser. No. 334,155, Apr. 6, 1989, Pat. No. 4,967,471.

[51] Int. Cl.⁵ .................................... B23P 11/00
[52] U.S. Cl. .................................... 29/430; 29/469; 29/559
[58] Field of Search ............. 29/430, 783, 784, 785, 29/792, 244, 281.1, 281.5, 469, 559, 822, 823, 824; 296/146, 152; 292/347, 336.3, DIG. 31

[56] References Cited

U.S. PATENT DOCUMENTS

| | | |
|---|---|---|
| 2,993,265 | 6/1961 | Bernhard et al. . |
| 3,641,959 | 2/1972 | Hurst . |
| 3,713,691 | 1/1973 | Bayless . |
| 3,795,965 | 3/1974 | Sherman . |
| 3,798,736 | 3/1974 | Gibbons et al. . |
| 3,832,432 | 8/1974 | Perry . |
| 4,373,129 | 2/1983 | Sugalski et al. . |
| 4,567,648 | 2/1986 | Doty . |
| 4,670,961 | 6/1987 | Fontain et al. ............... 29/430 X |
| 4,674,181 | 6/1987 | Hamada et al. ............. 29/430 X |
| 4,679,297 | 7/1987 | Hansen, Jr. et al. . |
| 4,715,110 | 12/1987 | St. Angelo et al. . |
| 4,777,783 | 10/1988 | Zald . |
| 4,827,671 | 5/1989 | Herringshaw et al. . |
| 4,831,710 | 5/1989 | Katoh et al. ............... 29/430 X |
| 4,928,385 | 5/1990 | Noguchi et al. . |

FOREIGN PATENT DOCUMENTS 12502 8/1976 Australia .
1211013 2/1986 U.S.S.R. .

Primary Examiner—Mark Rosenbaum
Assistant Examiner—Frances Chin

[57] ABSTRACT

A handle case and a handle which are substantially assembled are clamped on a pallet with respective first and second clamping means on the pallet, and the pallet is conveyed along a looped conveyor. The handle case and the handle are connected operatively to each other with a hinge in a first assembling station disposed alongside of the conveyor. Then, the pallet is conveyed successively through other assembling stations disposed along the conveyor to install other door handle components on the handle case and the handle in the other assembling stations.

5 Claims, 34 Drawing Sheets

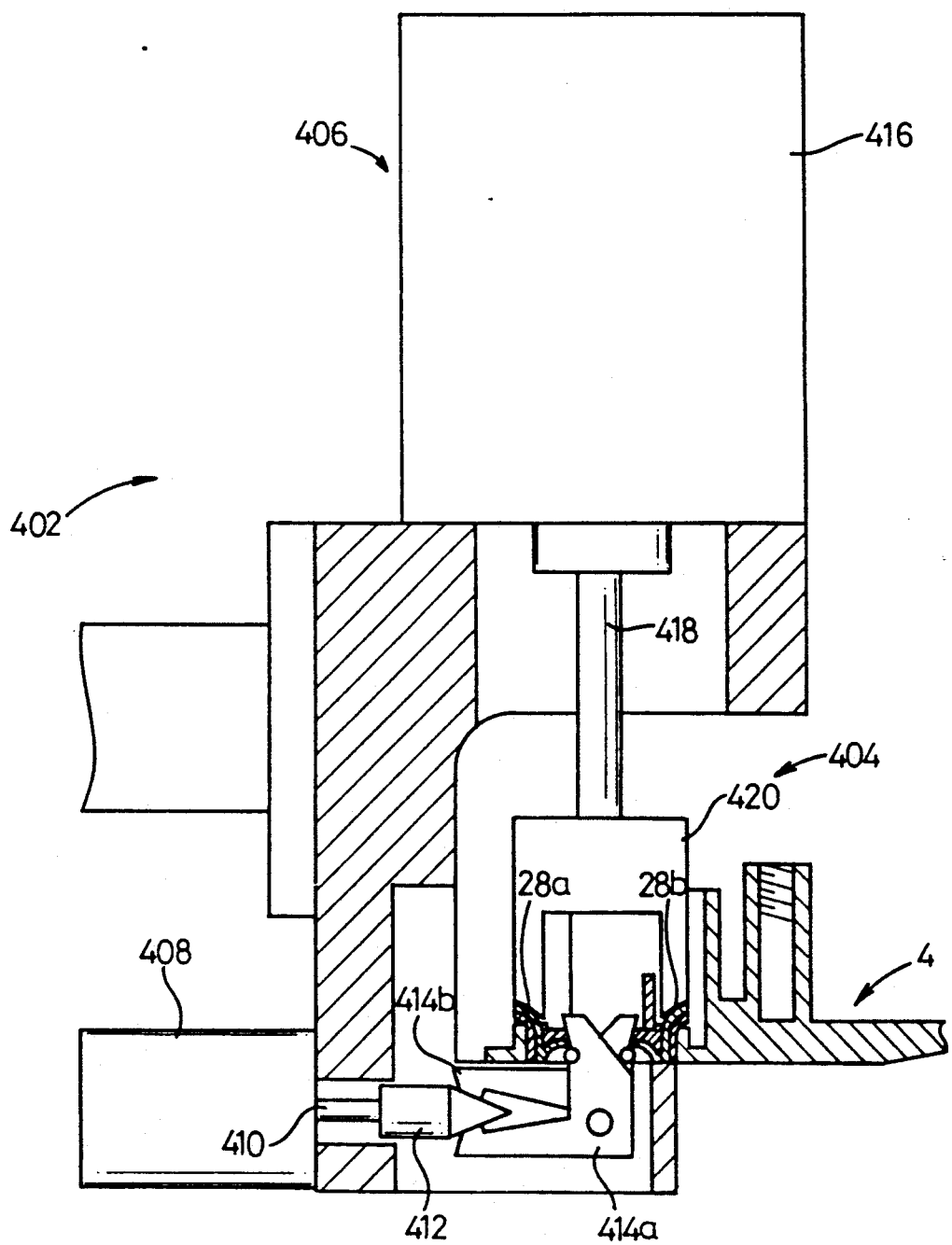

METHOD OF AND APPARATUS FOR ASSEMBLING DOOR HANDLE

This application is a divisional of copending application Ser. No. 07/334,155, filed on Apr. 6, 1989 U.S. Pat. No. 4,967,471.

BACKGROUND OF THE INVENTION

1. Field of the Invention

The present invention relates to a method of and an apparatus for assembling a door handle, and more particularly to a method of and an apparatus for assembling a door handle completely automatically from door handle components in a system for producing door handles to be installed on the outer surface of automotive door panels.

2. Description of Related Art

When getting into an automobile, a door of the automobile is opened by gripping a door handle installed on the outer surface of the panel of the door. One known door handle for use on an automobile door is illustrated in FIGS. 1 and 2 of the accompanying drawings. FIG. 1 shows the various components of a door handle assembly 2, and FIG. 2 illustrates the door handle assembly 2 as it is completed.

The door handle assembly 2 basically comprises a handle case 4 and a handle 6, and also includes various other accessory parts. The handle 6 is angularly movably coupled to the handle case 4 by means of hinge pins 8a, 8b. More specifically, the handle 6 includes a hinge lever 10a connected to support arms 12a, 12b of the handle case 4 by the hinge pin 8a, and another hinge lever 10b connected to support arms 12c, 12d of the handle base 4 by the hinge pin 8b. Torsion coil springs 14a, 14b coact respectively between the support arm 12b and the hinge lever 10a and between the support arm 12c and the hinge lever 10b for normally holding the handle 6 against the handle case 4 when the handle 6 is assembled in the handle case 4. Stoppers 16 of rubber are mounted in the handle case 4 for preventing the handle 6 from directly hitting the handle case 4 to protect the handle case 4.

The handle case 4 has an integral protective member 18 projecting inwardly from the inner surface of a corner of the handle case 4. The protective member 18 serves to surround a lock in a door to protect the same when the door handle assembly 2 is installed on the door. A key guard assembly 20 is mounted in the protective member 18. The key guard assembly 20 comprises an annular gasket 22 and a gasket cap 24 by which the gasket 22 is fixed to the outer end of the protective member 18 and protected from damage. For attaching the key guard assembly 20, the gasket cap 24 and the gasket 22 are axially combined together into the key guard assembly 20, and then tongues 28a, 28b on the gasket cap 24 are inserted respectively into grooves 26a, 26b defined in the handle case 4 and bent over by staking into firm engagement with the handle case 4.

A case gasket 30 is interposed between the handle case 4 and a door panel 31 to provide a seal therebetween. The handle case 4 has a plurality of protrusions 32 on an outer peripheral flange thereof which are inserted into respective holes defined in the case gasket 30 and subsequently deformed by staking to hold the case gasket 30 in position. A bushing 34 is inserted in the hinge lever 10a and coupled to the mechanism of the lock in the door.

As described above, the door handle assembly 2 is comprised of the handle case 4, the handle 6, the hinge pins a, 8b, the coil springs 14a, 14b, and other small components. To assemble the door handle assembly 2, the small parts such as the key guard assembly 20, the stoppers 16, and the case gasket 30 are first installed on the handle case 4, and then the handle 6 and the handle case 4 are coupled to each other by the coil springs 14a, 14b and the hinge pins 8a, 8b.

The above assembling procedure is necessitated for the following reasons: For putting the key guard assembly into the handle case 4, three assembling steps are required: First, the gasket 22 and the gasket cap 24 are combined into the key guard assembly 20. Then, the tongues a, 28b on the gasket cap 24 are inserted respectively into the grooves 26a, 26b in the handle case 4. Finally, the tongues 28a, 28b are bent radially inwardly by a staking tool to fasten the key guard assembly 20 to the handle case 4. The key guard assembly 20 has to be inserted into the handle case 4 from its face side. To attach the case gasket 30 to the handle case 4, the handle case 4 is reversed or turned over and fixed to a suitable jig. Then, the case gasket 30 is mounted on the handle case 4 in engagement with the protrusions 32, which are thereafter deformed by a hand tool to fasten the case gasket 30 to the handle case 4. Since the handle case 4 must be kept in one position for installing one component, and then reversed into another position for installing another component, it is necessary that the small parts be attached to the handle case 4 at first and then the handle case 4 and the handle 6 be coupled to each other.

As described above, it is current practice to assemble the door handle assembly 2 only with manual labor, using jigs and tools suitable for use in respective assembling steps.

However, the manual assembling process is disadvantageous in that the assembling capability is limited and the efficiency depends on the skill of the worker who assembles the components. If the efficiency is to be increased according to the present manual method, the cost of skillful manual labor will also be increased, and so will the cost of manufacture as personal expenses have a large share in the overall cost these days. Therefore, there has been a strong demand in the art for a fully automated process for assembling door handles.

SUMMARY OF THE INVENTION

It is a general object of the present invention to provide a method of and an apparatus for assembling a door handle completely automatically in a process ranging from the supply of door handle components to the assembly of these door handle components, without any manual intervention, so that the door handle can be assembled highly efficiently.

Another object of the present invention is to provide a method of assembling a door handle, comprising the steps of: clamping a handle case and a handle which are substantially assembled on a pallet with respective first and second clamping means on said pallet; conveying said pallet along a looped conveyor; connecting said handle case and said handle operatively to each other with hinge means in a first assembling station disposed alongside of said conveyor; and thereafter conveying said pallet successively through other assembling stations disposed along said conveyor to install other door handle components on said handle case and said handle in said other assembling stations.

Still another object of the present invention is to provide a method of assembling a door handle, wherein said hinge means comprises a pair of first and second coil springs and a pair of first and second hinge pins, further including the steps of: installing said first coil spring and said second hinge pin on said handle case and said handle in said first assembling station; and thereafter installing said second coil spring and said second hinge pin on said handle case and said handle in a next assembling station.

Still another object of the present invention is to provide a method of assembling a door handle, wherein said other door handle components include a stopper to be installed in one of said other assembling stations, further including the steps of: releasing said first clamping means to unclamp said handle case while clamping said handle to said pallet with said second clamping means in one of said other assembling stations; thereafter, turning said handle case on said handle in said one of the other assembling stations; and inserting the stopper into said handle case in said one of the other assembling stations.

Yet another object of the present invention is to provide an apparatus for assembling a door handle primarily from a handle case and a handle in an assembling station disposed alongside of a looped conveyor, said apparatus comprising: means for clamping a handle case and a handle which are substantially assembled on a pallet; pin hole registering means for inserting a guide pin into pin holes defined respectively in said handle case and said handle to register said pin holes with each other; pin inserting means for receiving a supplied hinge pin and inserting the hinge pin through said pin holes in coaction with said pin hole registering means; and positioning means for positioning a hinge lever of said handle.

Yet still another object of the present invention is to provide an apparatus for assembling a door handle, wherein said pin hole registering means includes a table movable back and forth in a direction in which said hinge pin is inserted through said pin holes, and a rotative drive source mounted on said table, said guide pin being mounted on said table and rotatable about its own axis by said rotative drive source.

A further object of the present invention is to provide an apparatus for assembling a door handle, wherein said pin inserting means includes a table movable back and forth in a first direction in which said hinge pin is inserted through said pin holes, chuck means mounted on said table for holding the hinge pin, said chuck means being movable back and forth in a second direction transverse to said first direction, and a plate member mounted on said table for holding a rear portion of said hinge pin when the hinge pin is inserted through said pin holes, said plate member being arranged in said second direction.

A yet further object of the present invention is to provide an apparatus for assembling a door handle, further including a first cylinder for moving said pin hole registering means back and forth, a second cylinder for moving said pin inserting means back and forth, and an auxiliary cylinder interconnecting said first and second cylinders.

Another object of the present invention is to provide an apparatus for assembing a door handle primarily from a handle case and a handle in an assembling station disposed alongside of a looped conveyor, said apparatus comprising: means for clamping a handle case and a handle which are substantially assembled on a pallet; stopper supply means for receiving a stopper in a vertically movable socket and moving said stopper into engagement with a needle on a robot wrist; and a jig for temporarily unclamping said handle case and turning said handle case when said stopper is to be installed on said handle case.

Still another object of the present invention is to provide an apparatus for assembling a door handle, wherein said jig includes a vertical surface plate, a clamp release lever movable back and forth by a first cylinder for engaging a clamping member on said pallet, and a hand for engaging said handle case and turning the handle case with a second cylinder.

Still another object of the present invention is to provide an apparatus for assembling a door handle, wherein said stopper supply means includes a positioning plate for engaging a bar mounted on said robot wrist and having said needle on a distal end thereof for holding said bar in a predetermined position when said stopper engages said needle.

Yet another object of the present invention is to provide a pallet for delivering a handle case and a handle on a looped conveyor while fixing said handle case and said handle in position, said pallet comprising: first clamping means for clamping said handle case while holding said handle case and said handle in a substantially assembled relationship; and second clamping means for clamping said handle.

Yet still another object of the present invention is to provide a pallet further including a body and a plurality of positioning members mounted on a peripheral edge of said body for holding said handle case against displacement, said first clamping means being disposed on a side of said body for clamping said handle case, and said second clamping means being disposed on a center of said body for clamping said handle.

A further object of the present invention is to provide a pallet wherein said first clamping means comprises a pair of clamping members angularly movably mounted on said body and normally urged by respective coil springs to cause distal ends thereof to engage said handle case.

A yet further object of the present invention is to provide a pallet wherein said second clamping means comprises a clamp lever for clamping said handle, and a pair of push rods normally urged by respective coil springs having different resilient forces to engage said clamp lever in confronting relation to each other.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 30a and 30b are cross-sectional views illustrating the manner in which the end effector of FIG. 29 operates;

DETAILED DESCRIPTION OF THE PREFERRED EMBODIMENT

First, an assembling system incorporating a door handle assembling apparatus according to the present invention will be described.

Figure 2:
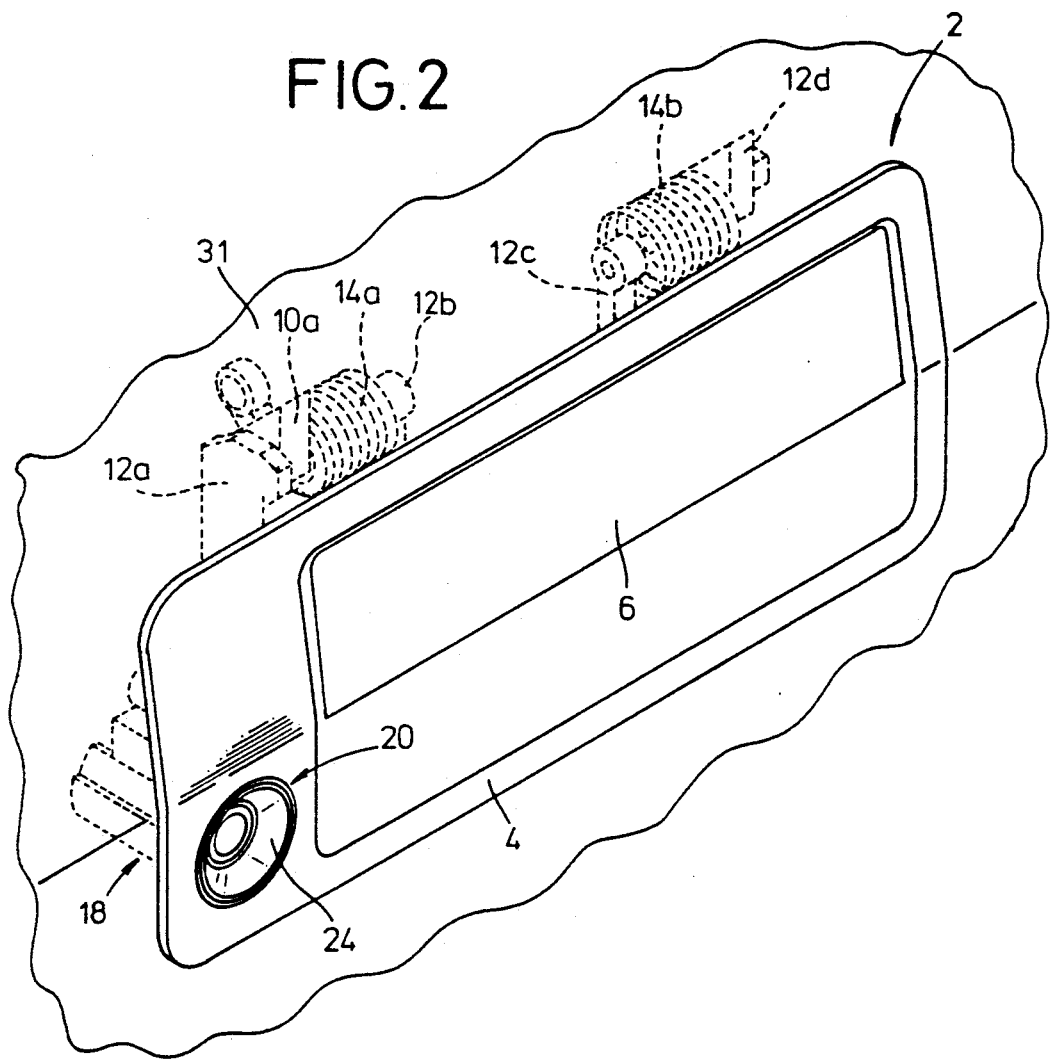
FIG. 2 is a perspective view of the completed door handle mounted on a door panel.
Figure 3:
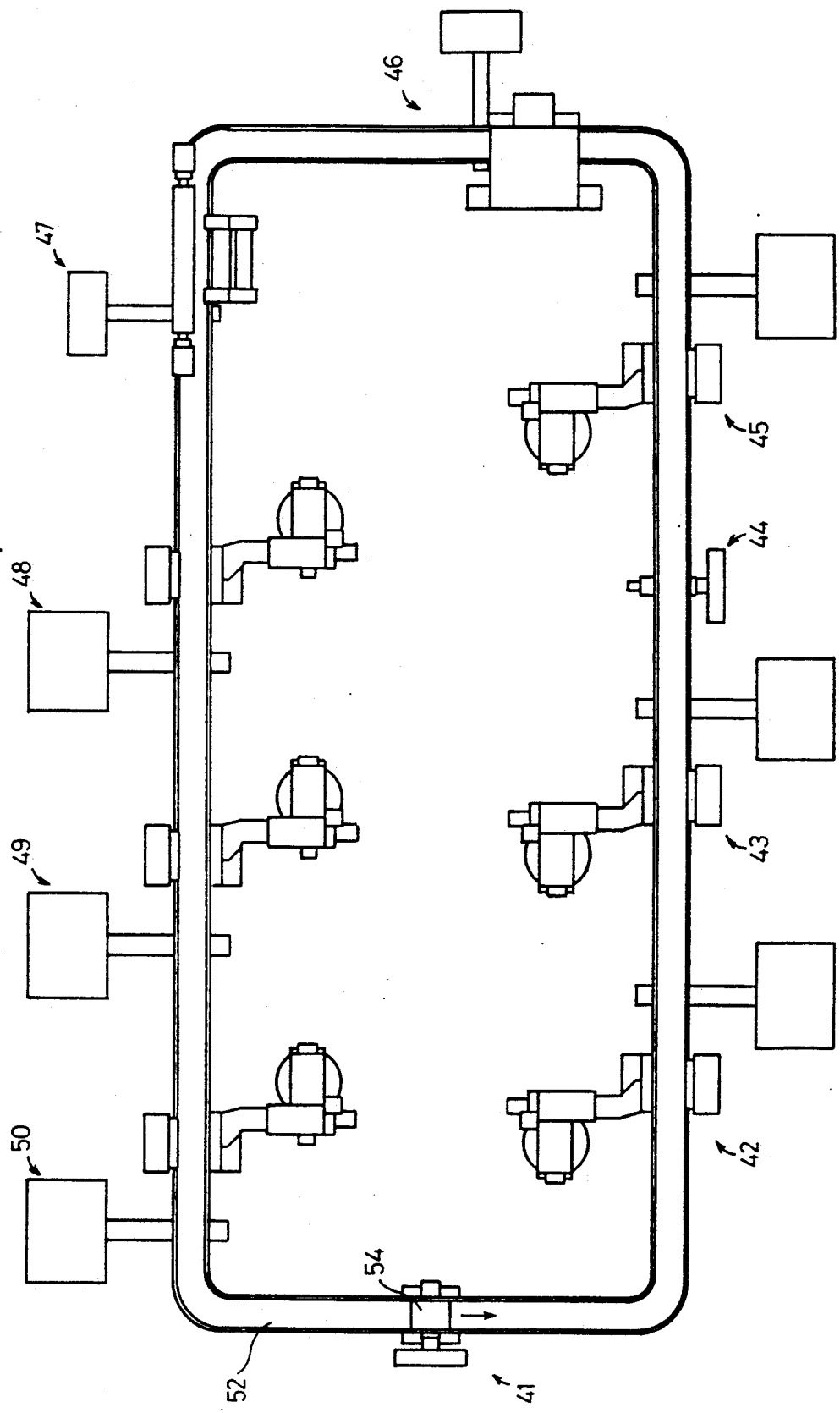
FIG. 3 is a schematic plan view of an assembling system incorporating the door handle assembling apparatus according to the present invention.

FIG. 3 shows an assembling system 40 in plan which includes first through tenth assembling stations 41 through 50. Door handle components are successively assembled in the assembling stations 41 through 50, and a door handle is completed in the tenth assembling station 50. The door handle to be assembled by the door handle assembling apparatus is identical to the door handle assembly 2 shown in FIGS. 1 and 2. The door handle components are denoted by identical reference numerals employed in FIGS. 1 and 2, and will not be described in detail. A door handle that can be assembled by the door handle assembling apparatus is not limited to the illustrated design, but may be of another construction.

Assembling steps to be carried out in the respective first through tenth assembling stations 41 through 50 are briefly summarized in the following Table 1:

| Station | Operation |
|---|---|
| First station 41 | Fixing of workpieces |
| Second station 42 | Installation of hinge pins 8a, 8b and coil springs 14a, 14b |
| Third station 43 | Installation of hinge pins 8a, 8b and coil springs 14a, 14b |
| Fourth station 44 | Standby operator |
| Fifth station 45 | Setting of case gasket 30 |
| Sixth station 46 | Fixing of case gasket 30 |
| Seventh station 47 | Staking of hinge pins 8a, 8b |
| Eighth station 48 | Mounting of key guard assembly 20 |
| Ninth station 49 | Insertion of bushing 34 |
| Tenth station 50 | Mounting of stopper 16 |

Figure 4:
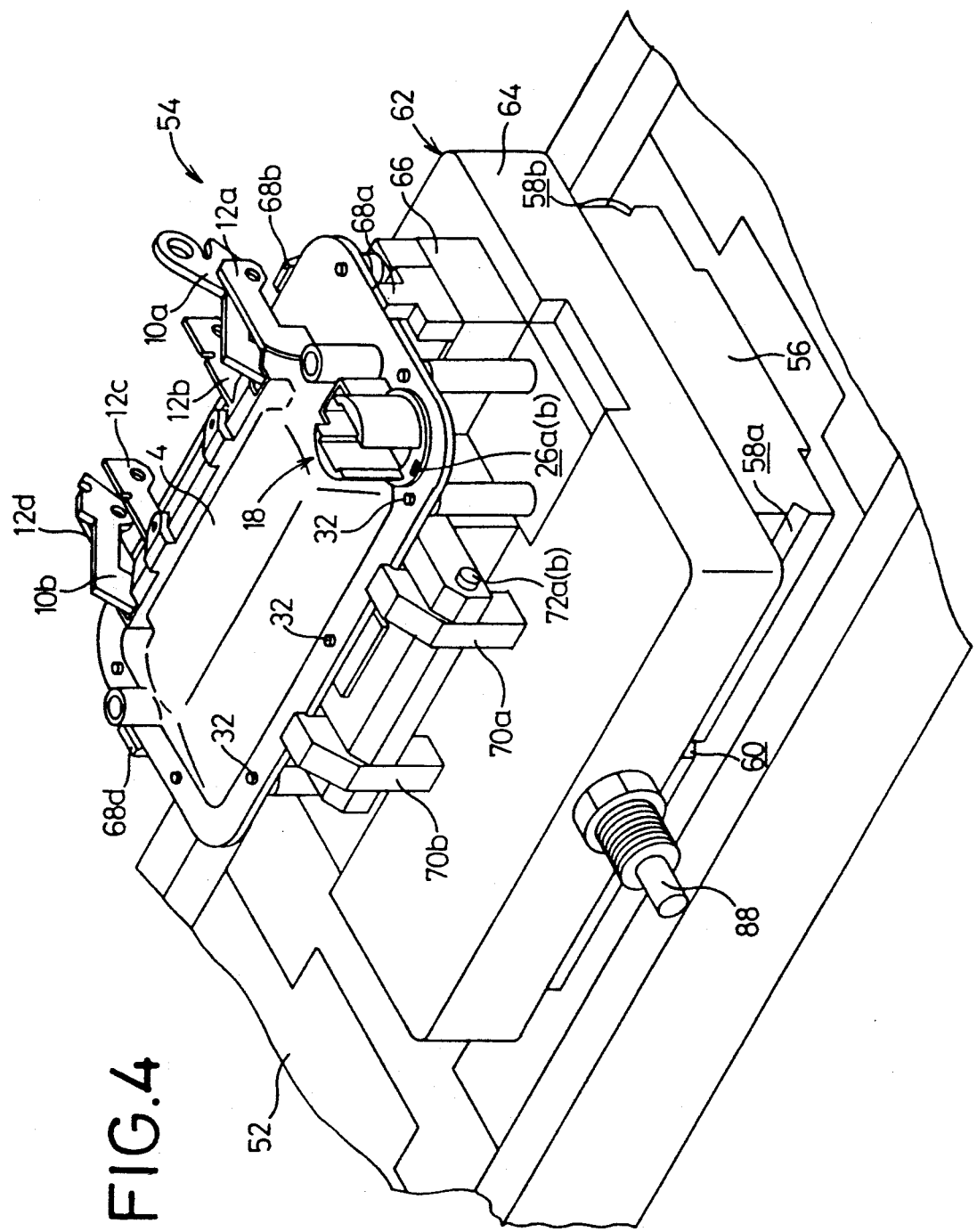
FIG. 4 is a perspective view of a pallet with a handle case and a handle fixed to the pallet.
Figure 5:
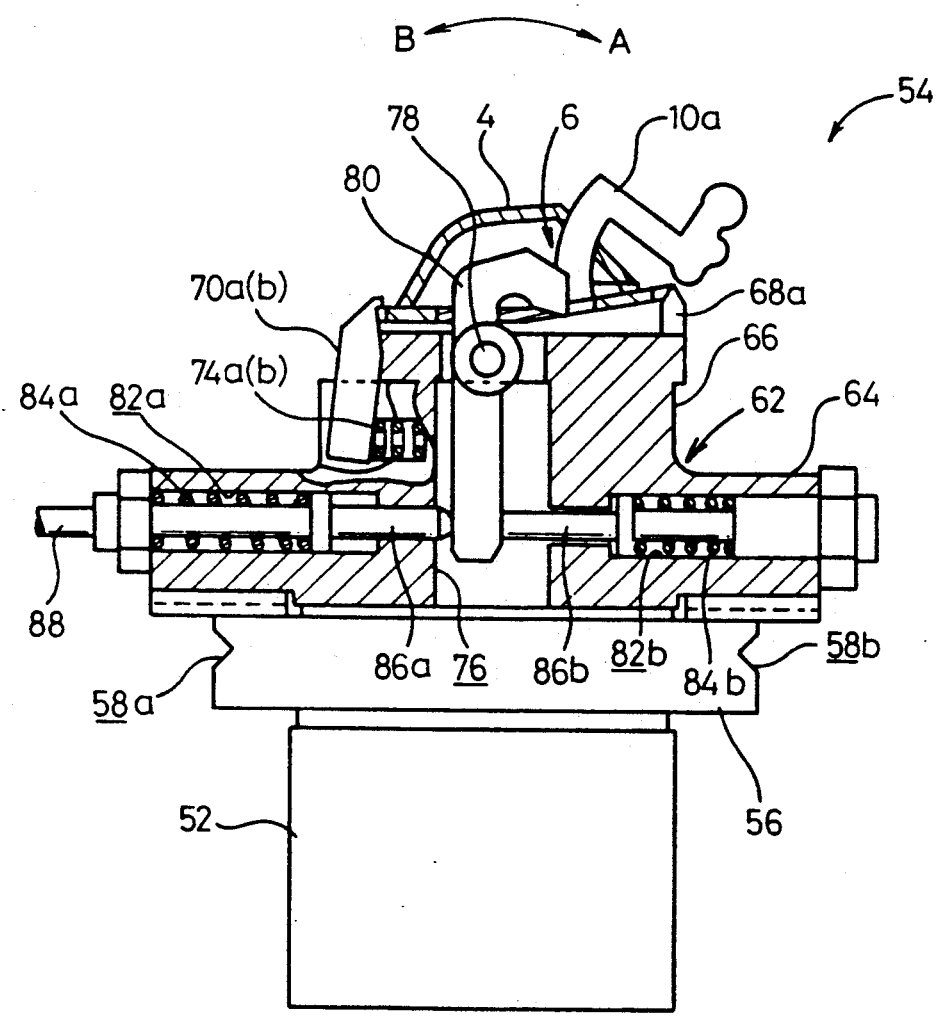
FIG. 5 is a cross-sectional view of the pallet.

The first through tenth assembling stations 41 through 50 are disposed alongside of a looped conveyor 52. The conveyor 52 carries and conveys a number of pallets on which workpieces are fixedly mounted. FIGS. 4 and 5 shows in detail such a pallet 54 on which workpieces, such as, a handle case 4 and a handle 6, are clamped. The pallet 54 has a clamping means for clamping the handle case 4 and another clamping means for clamping the handle 6. The handle case 4 and the handle 6 are fixed to the pallet 54 while they are substantially assembled together, as shown in FIG. 4.

The pallet 54 includes a pallet base 56 having a pair of horizontal notches 58a, 58b defined in opposite sides thereof for receiving dog chucks (not shown) disposed in each of the assembling stations alongside of the conveyor 52 to stop the pallet 54 in position at each assembling position. One of the sides of the pallet base 56 has a vertical notch 60 defined therein across the horizontal notch 58a, for example. The pallet 54 can be positioned more accurately in each assembling station by engaging another dog chuck in the vertical notch 60.

A jig body 62 is fixedly mounted on the upper surface of the pallet base 56. The jig body 62 includes a first block 64 in the shape of a rectangular parallelepiped and a second block 66 disposed substantially centrally on the upper surface of the first block 64. Positioning members 68a through 68d are mounted on the upper surface of the second block 66 for engaging peripheral edges of the handle case 4 to position the handle case 4 against unwanted displacement. The first clamping means for clamping the handle case 4 is disposed on one side of the second block 66. More specifically, the first clamping means includes a pair of clamping members 70a, 70b angularly movably attached to the second block 66 by means of respective pins 72a, 72b. Compression coil springs 74a, 74b housed in the second block 66 engage the lower ends of the clamping members 70a, 70b, respectively, for normally urging the clamping members 70a, gers thereof to hold the handle case 4 down against the second block 66 (see FIG. 5).

The second clamping means for clamping the handle 6 is positioned substantially centrally in the jig body 62. More specifically, as illustrated in FIG. 5, the second clamping means includes a vertically extending hole 76 defined through the second block 66, and a clamp lever 80 disposed in the hole 76 and swingably supported by a pin 78. The first block 64 has a pair of horizontal holes 82a, 82b defined therein and communicating with the vertical hole 76, the holes 82a, 82b extending from the opposite sides of the first block 64 toward each other. Push rods 86a, 86b are disposed respectively in the holes 82a, 82b and have respective distal ends engaging the lower end of the clamp lever 80 in confronting relation under the resiliency of respective coil springs 84a, 84b disposed in the holes 82a, 82b around the push rods 86a, 86b. The coil spring 84b produces larger resilient forces than the coil spring 84a, so that the push rod 86b turns the clamp lever 80 about the pin 78 in the direction of the arrow A at all times against the bias of the coil spring 84a. Therefore, the handle 6 is held in position by a bent upper distal end of the clamp lever 80. A clamp release rod 88 engages the outer end of the push rod 86a. By bushing the clamp release rod 88, the clamp lever 80 is turned about the pin 78 in the direction of the arrow B to unclamp the handle 6.

The structure and operation of devices in the respective first through tenth assembling stations 41 through 50 will be described below in relation to assembling steps to be carried out in the respective assembling stations.

The first assembling station 41 operates to fix the handle case 4 and the handle 6 to the pallet 54. The operator who attends the first assembling station 41 actuates the clamping means on the pallet 54 to clamp the handle case 4 and the handle 6 thereon in a substantially assembled condition as shown in FIGS. 4 and 5. More specifically, after the operator has put the handle case 4 and the handle 6 together, the operator brings the handle case 4 into engagement with the positioning members 68a through 68d and pushes the clamp release rod 88 to turn the clamp lever 80 slightly in the direction of the arrow B, allowing the handle 6 to be positioned below the distal end of the clamp lever 80. Then, the clamp release lever 88 is released to cause the push rod 86b, which is biased by the coil spring 84b that is stronger in resiliency than the coil spring 84a which biases the push rod 86a, to turn the clamp lever 80 in the direction of the arrow A until the bent upper end thereof holds the handle 6 down in position. As shown in FIG. 4, the handle case 4 is prevented from positional displacement by the positioning members 68a through 68d, and fixed in position by the upper fingers of the clamping members 70a, 70b.

The handle case 4 and the handle 6 as they are assembled together are thus held on the pallet 54, which is delivered on the conveyor 52 to the second assembling station 42. According to the principles of the assembling method of the invention, the handle case 4 and the handle 6 are first put together as described above, and then other accessory components are installed on the handle case 4 and the handle 6.

The second and third assembling stations 42, 43 have devices for attaching hinge pins 8a, 8b and coil springs 14a, 14b to the handle case 4 and the handle 6 which have been conveyed from the first assembling station 4 by the conveyor 52, so that the handle case 4 and the handle 6 are hinged to each other. More specifically, in the second assembling station 42, the hinge pin 8b is inserted through the support arms 12c, 12d of the handle case 4 and the hinge lever 10b of the handle 6, and the coil spring 14b is placed in engagement with the support arm 12c and the hinge lever 10b. In the third station 43, the hinge pin 8a is inserted through the support arms 12a, 12b of the handle case 4 and the hinge lever 10a of the handle 6, and the coil spring 14a is placed in engagement with the support arm 12b and the hinge lever 10a. The operation of the second assembling station 42 are thus substantially the same as the operation of the third assembling station 43. Therefore, only the second assembling station 42 will be described below, and those parts of the third assembling station 43 which are identical to those of the second assembling station 42 are denoted at identical reference numerals and will not be described in detail.

The second assembling station 42 includes a handling robot 90 for attaching the coil spring, and a pin inserting device 92 for inserting the hinge pin, and additionally has a parts feeder for supplying the coil spring and the hinge pin and a positioning mechanism for positioning the pallet 54 in place. The parts feeder and the positioning mechanism are not illustrated in FIG. 3.

Figure 6:
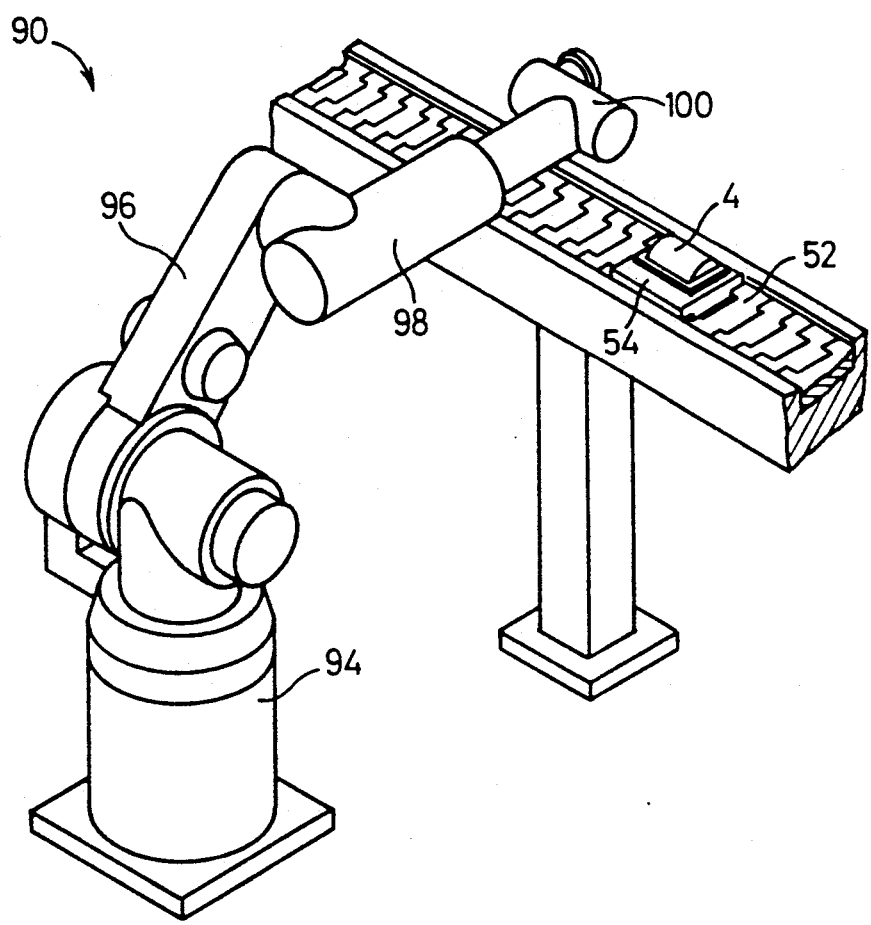
FIG. 6 is a perspective view of a handling robot installed in each assembling station in the assembling system.

FIG. 6 shows the handling robot 90. While the handling robot 90 may be any of various industrial robots which are currently available for use in production sites, the handling robot 90 in the illustrated embodiment comprises a known industrial robot having six axes with the number of degrees of freedom being 6. The handling robot 90 comprises a swivel base 94, a first arm 96, a second base 98, and a wrist 100 mounted on the distal end of the second arm 98. By teaching the wrist 90 through a desired path of movement, an end effector or hand mounted on the wrist 100 can be displaced along the desired path.

While not illustrated in FIG. 6, a chuck mechanism for gripping the coil springs 14a, 14b at their opposite ends is employed as the end effector. The handling robot 90 shown in FIG. 6 is also provided in each of the third, fifth, eighth, ninth, and tenth assembling stations 43, 45, 48, 49, 50. However, the handling robots 90 in these assembling stations have end effectors designed to achieve respective operations in the assembling stations. Such end effectors will be described later on with reference to the respective assembling stations.

The pin inserting device 92 will now be described with reference to FIGS. 7 through 9.

Figure 7:
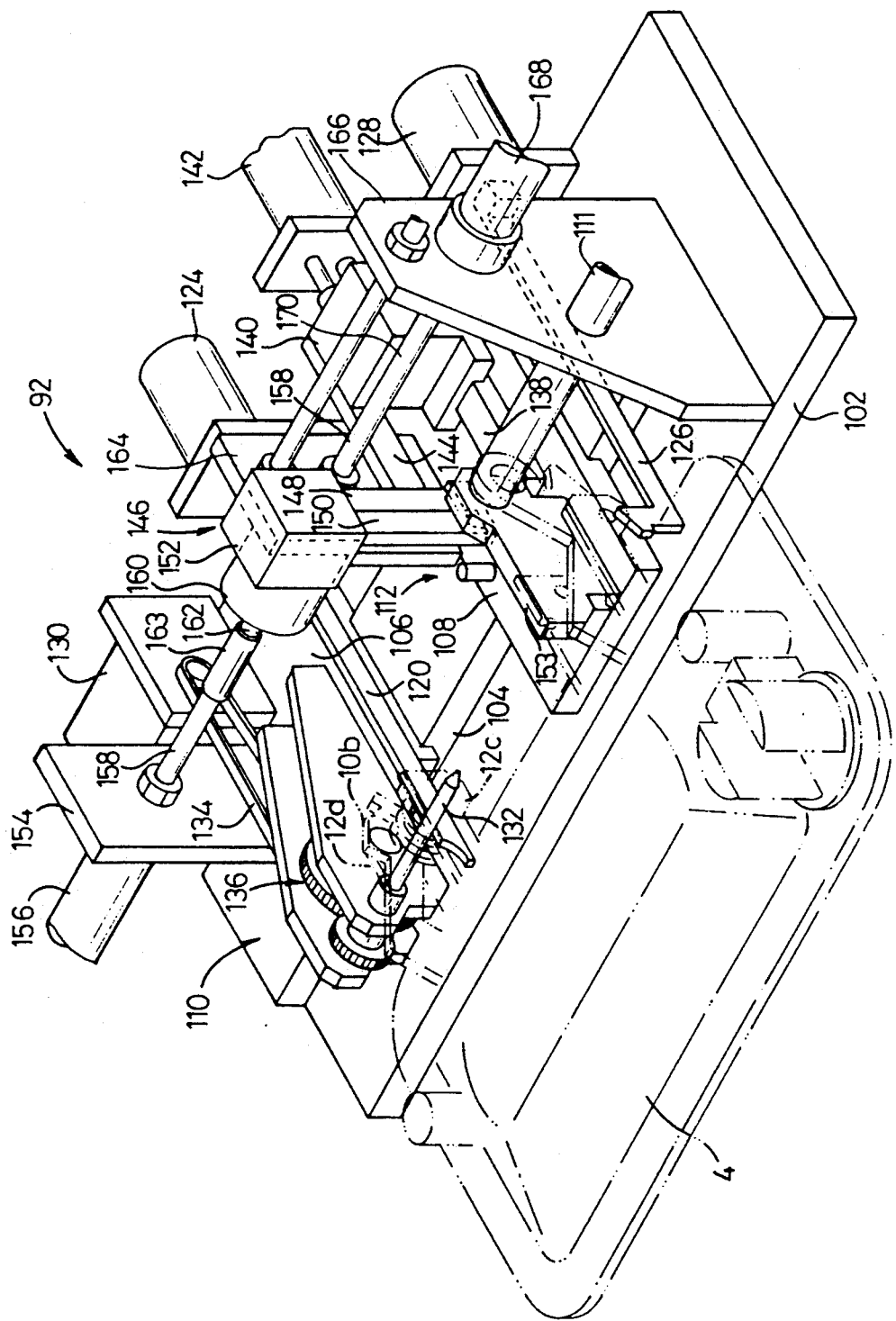
FIG. 7 is a perspective view of a pin inserting device in a second assembling station.

FIG. 7 shows the pin inserting device 92 in perspective. The pin inserting device 92 has a surface plate 102 mounted on a lifting and lowering mean including a drive source such as a cylinder. A guide plate 104 is fixedly mounted on the surface plate 102, and first and second slide tables 106, 108 which are slidable in the direction in which the hinge pin is inserted are fitted over the guide plate 104.

On the first slide table 106, there is disposed a pin hole registering means 110 for registering the pin holes in the handle case 4 and the handle 6 before a hinge pin is inserted and for guiding the hinge pin when it is inserted. A pin inserting means 112 is disposed on the second slide table 108 for receiving a hinge pin supplied from a supply tube 111 extending from the parts feeder and for inserting the received hinge pin into the pin holes. A first positioning member 120 is positioned as a positioning means near the first slide table 106 for positioning the hinge lever 10b of the handle 6 so that the hinge lever 10b will not be positionally displaced, the first positioning member 120 being axially movable back and forth by a first cylinder 124 of the positioning means. The other hinge lever 10a of the handle 6 is also positioned by another positioning means disposed alongside of the second slide table 108 and including a second positioning member 126 and a second cylinder 128.

The pin hole registering means 110 on the first slide table 106 comprises a rotative drive source 130 such as an electric motor, and a guide pin 132 rotatable by the motor 130 and insertable into the pin holes in the hinge lever 10b of the handle 6 and the support arms 12c, 12d of the handle case 4 for registering the pin holes to permit the hinge pin to be subsequently inserted smoothly and reliably. Rotative power from the motor 130 can be transmitted to the guide pin 132 by a belt 134 operatively coupled to the motor 130 and a gear train 136 for transmitting the rotation from the belt 134 at a predetermined speed ratio to the guide pin 132.

Figure 11:
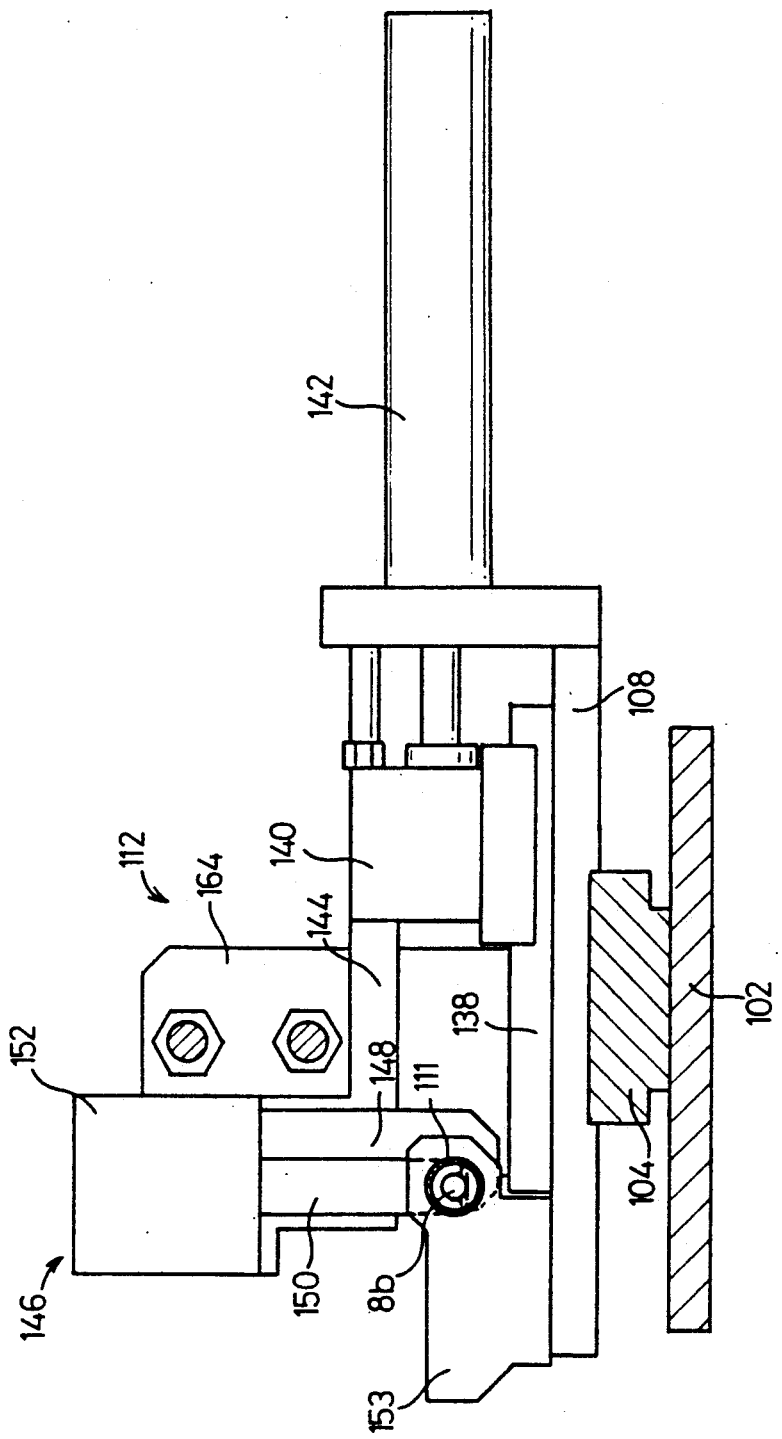
FIG. 11 is a side elevational view, partly in cross section, of the pin inserting device.

The pin inserting means 112 disposed on the second slide table 108 comprises a slide block 140 slidable in a direction normal to the direction of insertion of the guide pin along a guide rail 138 fixedly mounted on the second slide table 108, a drive source 142 in the form of a cylinder 142 for moving the slide block 140 back and forth, and a pin chuck means 146 mounted on the distal end of a bent attachment arm 144 extending from the slide block 140. The pin chuck means 146 is clearly illustrated in FIG. 11. The pin chuck means 146 is composed of a pin receiver 148 attached to the attachment arm 144, a pin gripper 150 for gripping the key-shaped distal end of the pin receiver 148 and a hinge pin, and a cylinder 152 coupled to the pin gripper 150. An upstanding bearing plate 153 for backing up the hinge pin when it is inserted is mounted on the second slide table 108 parallel to the direction of movement of the pin chuck means 146.

The pin hole registering means 110 and the pin inserting means 112 are coupled to each other by three cylinders. More specifically, the first slide table 106 supports thereon an upstanding bracket 154 to which there is secured a first cylinder 156 for displacing the pin hole registering means 110 along the guide plate 104. The first cylinder 156 has a piston rod 158 coupled to the piston rod 162 of an auxiliary cylinder 160 through a coupling 163. The auxiliary cylinder 160 is fixed to an upstanding bracket 164 mounted on the second slide table 108. The bracket 164 is connected to the piston rod 170 of a second cylinder 168 which is affixed to a vertical plate 166 mounted on the surface plate 102 for displacing the pin inserting means 112 along the guide plate 104. The auxiliary cylinder 160 serves to displace the pin inserting means 112 while holding the pin hole registering means 110 at rest. The pin inserting device 92 is basically constructed as described above.

The second assembling station 42 will operate as follows:

The handle case 4 and the handle 6 which are substantially put together are delivered by the pallet 54, which is then stopped in a predetermined position.

Figure 9:
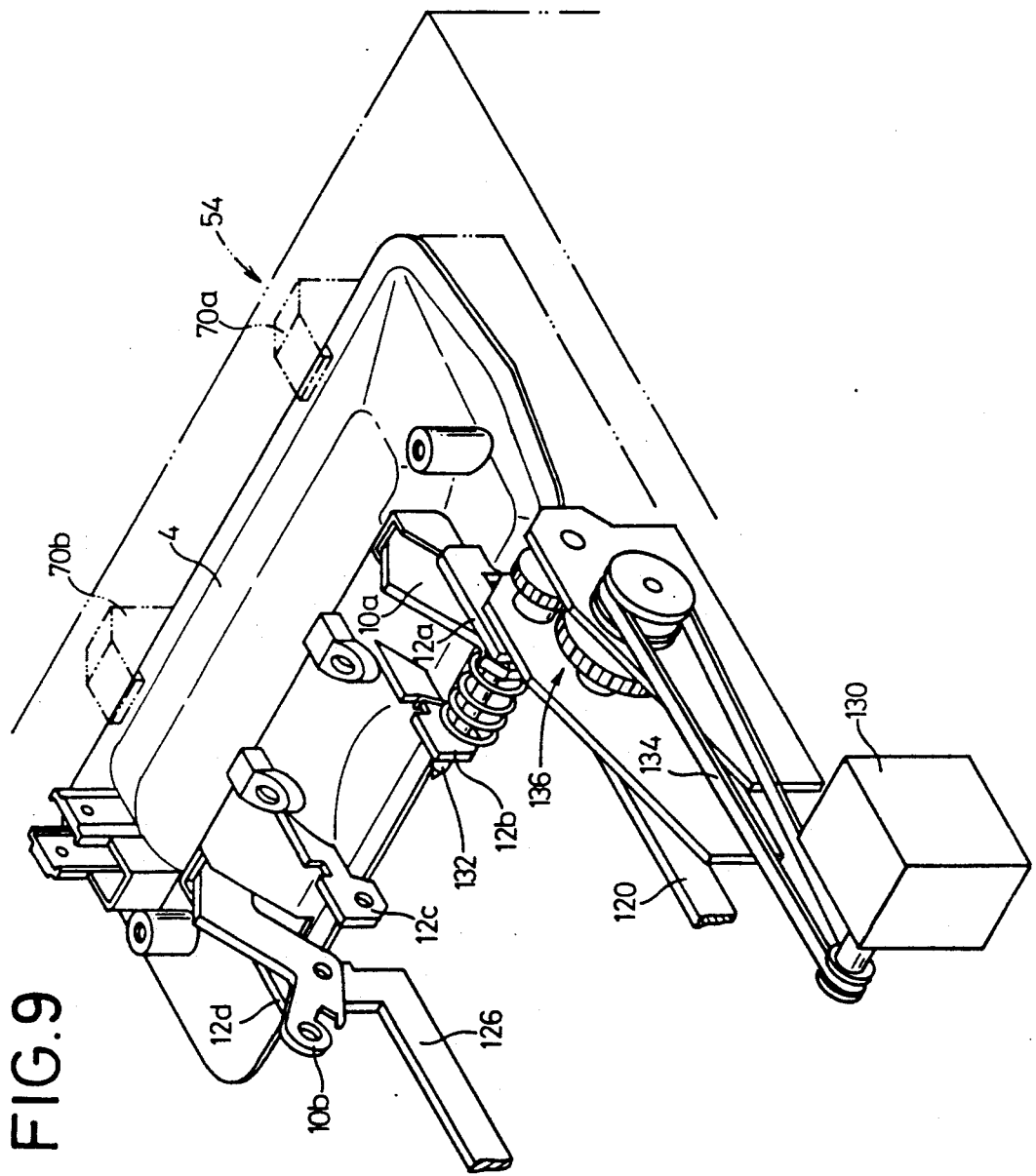
FIG. 9 is a perspective view of the pin inserting device at the time of inserting a guide pin.

As shown in FIG. 7, the first and second positioning members 120, 126 of the pin inserting device 92 are moved forwardly respectively by the cylinders 124, 128 until they engage the hinge levers 10a, 10b of the handle 6 to prevent their positional displacement (see FIG. 9). The hinge levers 10a, 10b are held in position by the positioning members 120, 126 in order to prevent the pin holes from being positionally displaced out of registration when the hinge pin is inserted, because the clamp lever 80 of the pallet 54 is biased under relatively small resilient forces and can easily be released manually.

The handling robot 90 shown in FIG. 6 then places the coil spring 14b between the support arm 12c of the handle case 4 and the hinge lever 10b of the handle 6 in engagement therewith.

Figure 8:
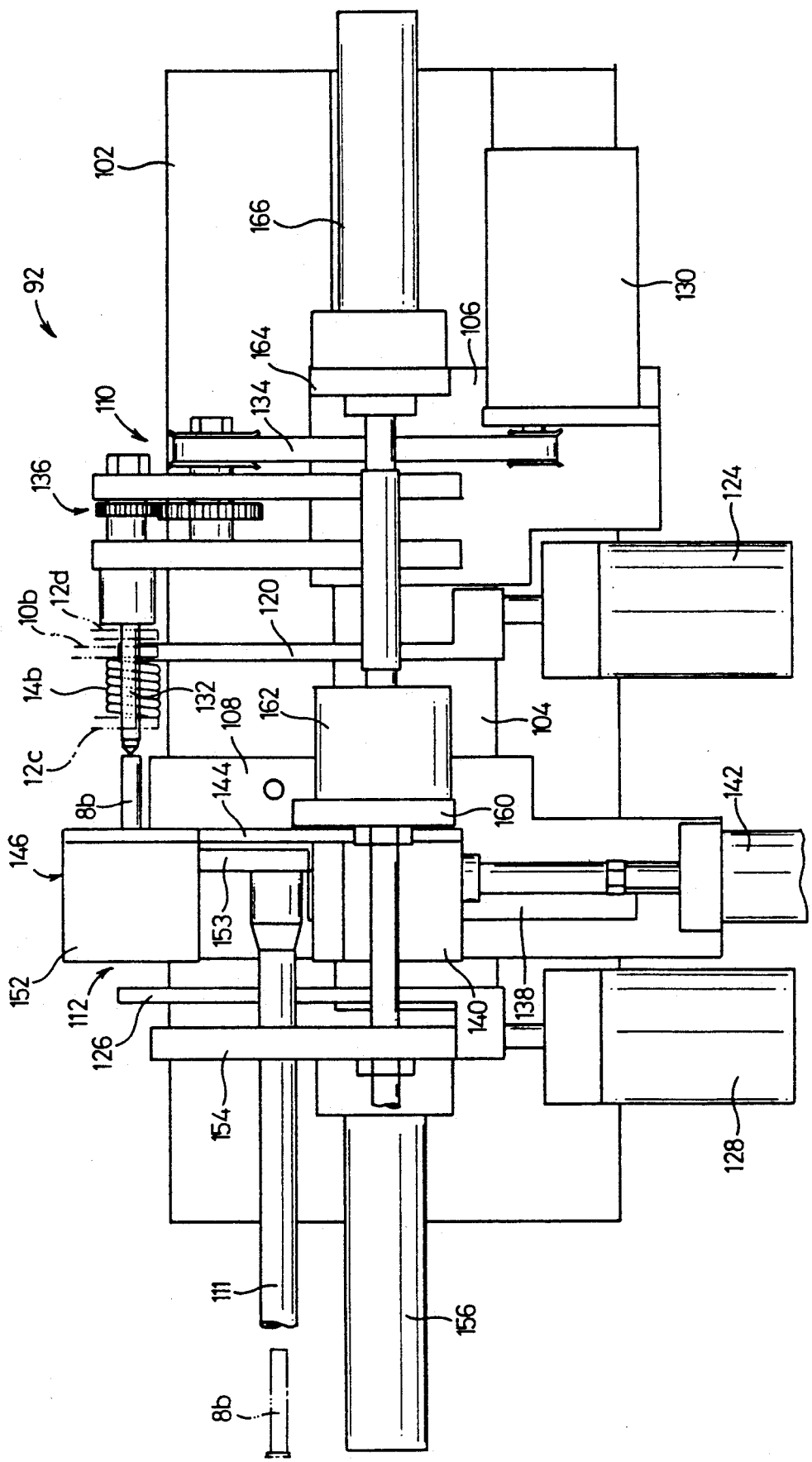
FIG. 8 is a plan view of the pin inserting device prior to the insertion of a hinge pin.

For inserting the hinge pin 8b into the pin holes in the support arms 12c, 12d and the hinge lever 10b, the pin inserting device 92 operates in the following manner:

In FIG. 8, the pin hole registering means 110 on the first slide table 106 is moved in the direction of the arrow by contracting the piston rod 158 of the first cylinder 156. At this time, the motor 130 is energized to rotate the guide pin 132 through the belt 134 and the gear train 136 while inserting the guide pin 132 into the pin holes in support arm 10b and the hinge levers 12c, 12d (see also the FIG. 9). Since the guide pin 132 is rotating about its own axis, it can easily be inserted into the pin holes and also remove any burrs from around the pin holes. By inserting the guide pin 132 into the pin holes, the pin holes are brought into complete registration with each other for allowing smooth and reliable insertion of the hinge pin.

Thereafter, the pin inserting means 112 on the second slide table 108 is operated to insert the hinge pin 8b. The hinge pin 8b is fed under pressure through the supply tube 111 until it engages the key-shaped distal end of the pin receiver 148 of the pin chuck means 146. At the same time, the pin gripper 150 is lowered by the cylinder 152 of the pin chuck means 146 to grip the hinge pin 86 between the pin receiver 148 and the pin gripper 150. With the hinge pin 86 thus gripped, the pin chuck means 146 is moved in its entirety in the direction of the arrow (FIG. 8) by the cylinder 142 until the gripped pin 8b reaches a position aligned with the pin holes.

Figure 10:
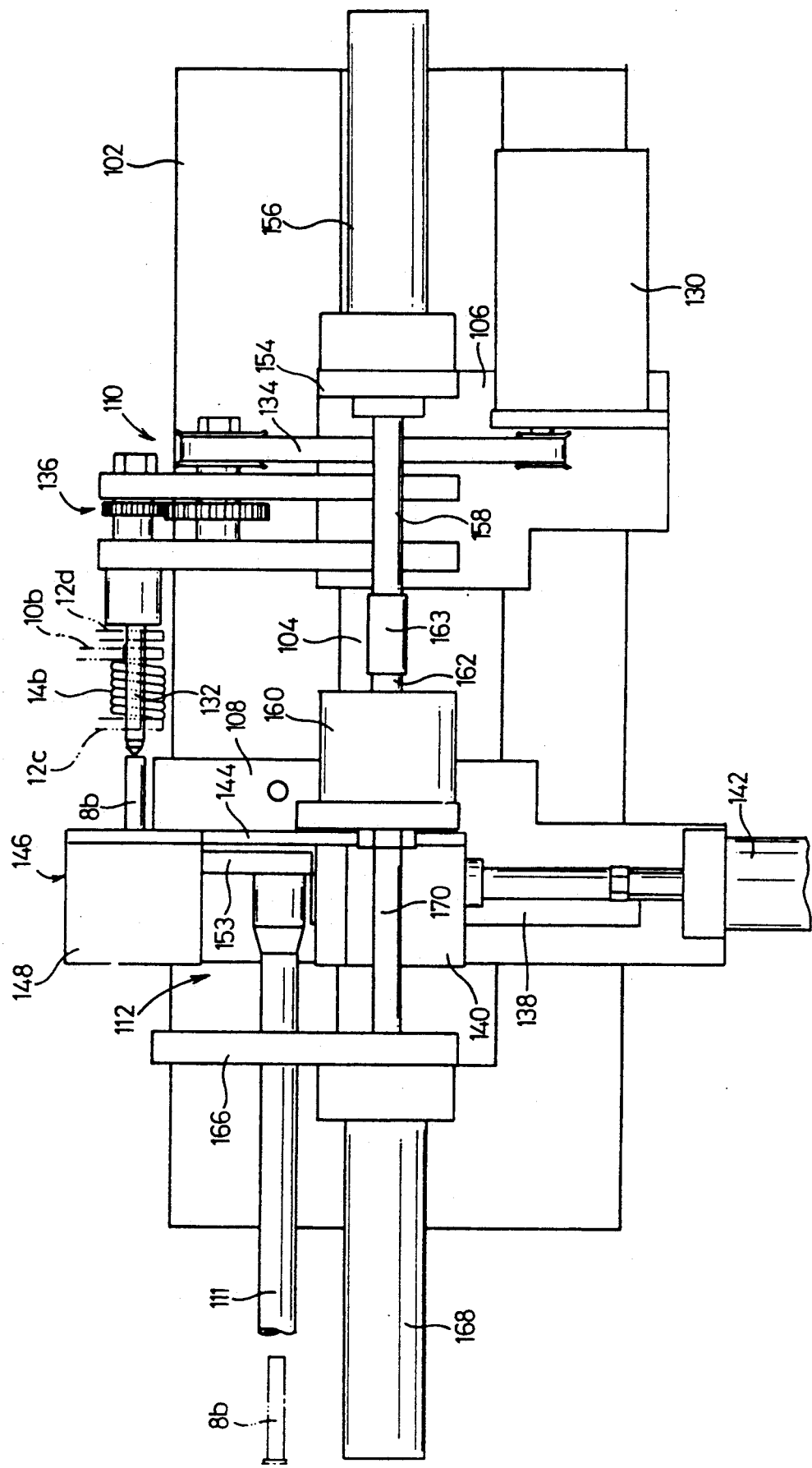
FIG. 10 is a plan view of the pin inserting device at the time of inserting the hinge pin.

The pin inserting means 112 is then displaced by extending the piston rod 170 of the second cylinder 168 and contracting the piston rod 162 of the auxiliary cylinder 160 while thus keeping the pin hole registering means 110 at rest, until the hinge pin 8b abuts against the tip of the guide pin 132, as shown in FIG. 10. Since the rear end of the hinge pin 8b engages the bearing or backup plate 153, the hinge pin 8b is not dislodged from the pin chuck means 146. The piston rod 170 of the second cylinder 168 is further extended and the piston rod 158 of the first cylinder 156 is also extended to insert the hinge pin 8b into the pin holes in the hinge lever 10b and the support arms 12c, 12d. At this time, the guide pin 132 is retracted out of the pin holes while guiding the hinge pin 8b. After the hinge pin 8b has been inserted, the pin hole registering means 110 and the pin inserting means 112 are brought back to their initial positions shown in FIG. 8 in readiness for a next pin hole registering cycle and a next hinge pin inserting cycle.

After the hinge pin 8b has been installed in the second assembling station 42, the workpieces on the pallet 54 are delivered into the third assembling station 43 in which the other hinge pin 8a is inserted. Operation of the third assembling station 43 will not be described here because it is structurally and functionally the same as the second assembling station 42 except that the hinge pin 8a is inserted in the direction opposite to the direction in which the hinge pin 8b is inserted by the pin inserting device 92.

After the hinge pin inserting process in the third assembling station 43, various components will be attached to the handle case 4 supported on the pallet 54 in the successive assembling stations.

No assembling device is provided in the fourth assembling station 44. Instead, the fourth assembling station 44 is attended by a standby operator who carries out the operation of any of the second, third, and fifth assembling stations 42, 43, 45 in the event of a problem with that assembling station, while the troubled assembling station is being shut off The fifth assembling station 45 has various devices required for attaching the case gasket 30 to the handle case 4. These various devices of the fifth assembling station 45 include a case gasket supply device 171 (FIG. 12) for supplying a case gasket to the handling robot, and a case gasket applicator 172 (FIG. 13) for attaching the supplied case gasket.

Figure 12:
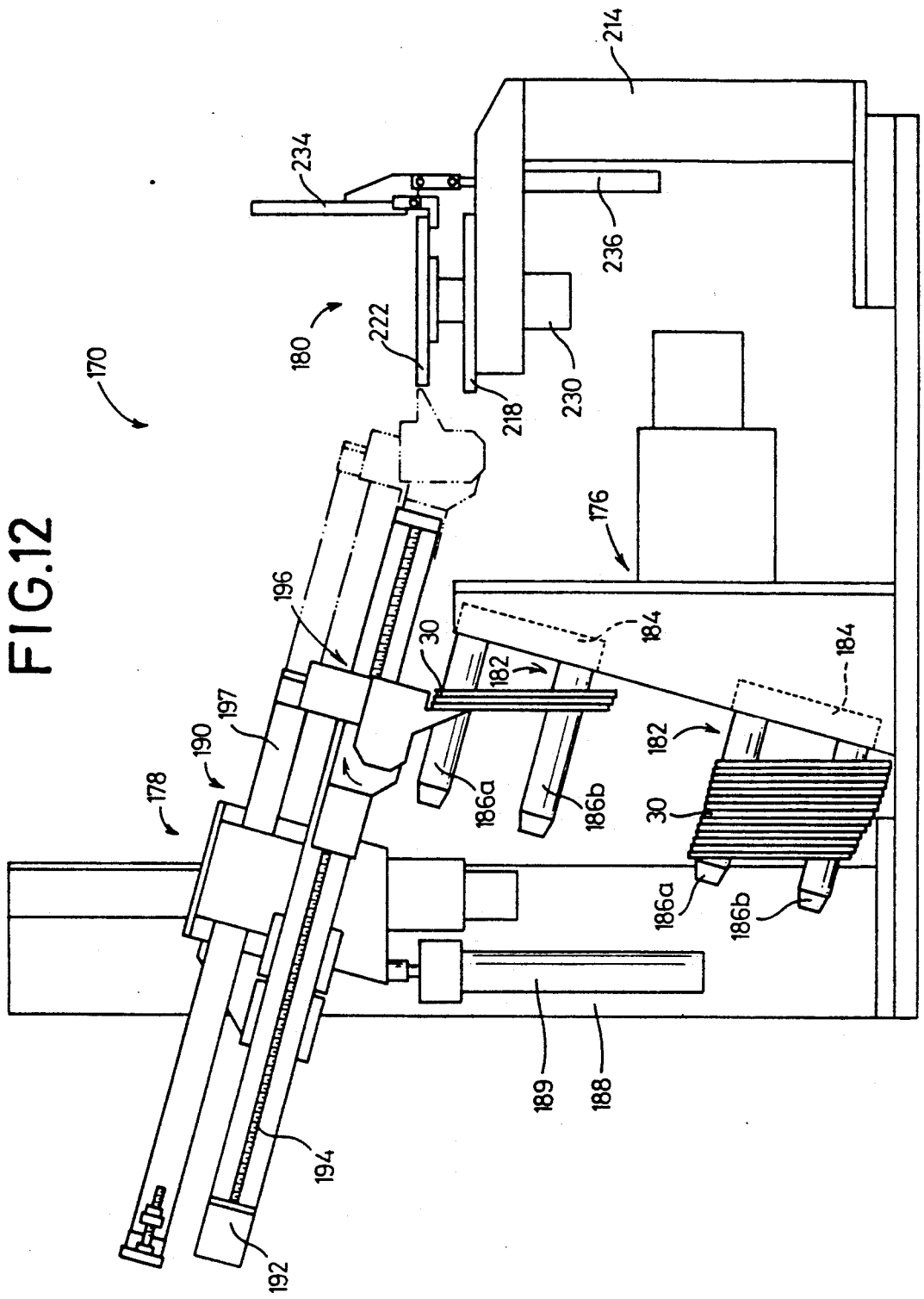
FIG. 12 is a side elevational view of a supply device for supplying a case gasket to a handling robot in a fifth assembling station.

As illustrated in FIG. 12, the case gasket supply device 170 comprises a gasket magazine unit 176 for delivering a stack of case gaskets 30 to a prescribed separating position, a pickup unit 178 as a feeding means for separating one case gasket 30, at a time, from the gasket stack which has been delivered by the gasket magazine unit 176 and for picking up the separated case gasket and feeding the same to a given position, and an alignment unit 180 for correcting the shape of the case gasket 30 which has been picked up by the pickup unit 178.

The gasket magazine unit 176 will first be described below. The gasket magazine unit 176 includes a drive mechanism for successively circulating a plurality of magazine racks 182 in a loop. Each of the magazine racks 182 comprises a magazine disc 184 and two bars 186a, 186b fixed to the magazine disc 184. Several tens of case gaskets 30 are supported and hung on the bars 186a, 186b. The magazine racks 182 are successively circulated in one direction while being kept at a constant angular position at all times by a parallel-link mechanism so that the case gaskets 30 are vertically suspended.

The pickup unit 178 is constructed as follows: The pickup unit 178 includes an upstanding frame 188 mounted on the floor and supporting a unit body 190 which is vertically movable by a cylinder 189 mounted on the frame 188. The unit body 190 is slightly tilted with respect to a horizontal plane and includes a ball screw 194 which is rotatable about its own axis by a motor 192. A gripping mechanism 196 for picking up case gaskets 30 one by one is threaded over the ball screw 194, and is movable along a guide bar 197 parallel to the ball screw 194 by the ball screw 194 driven by the motor 192.

Figure 14:
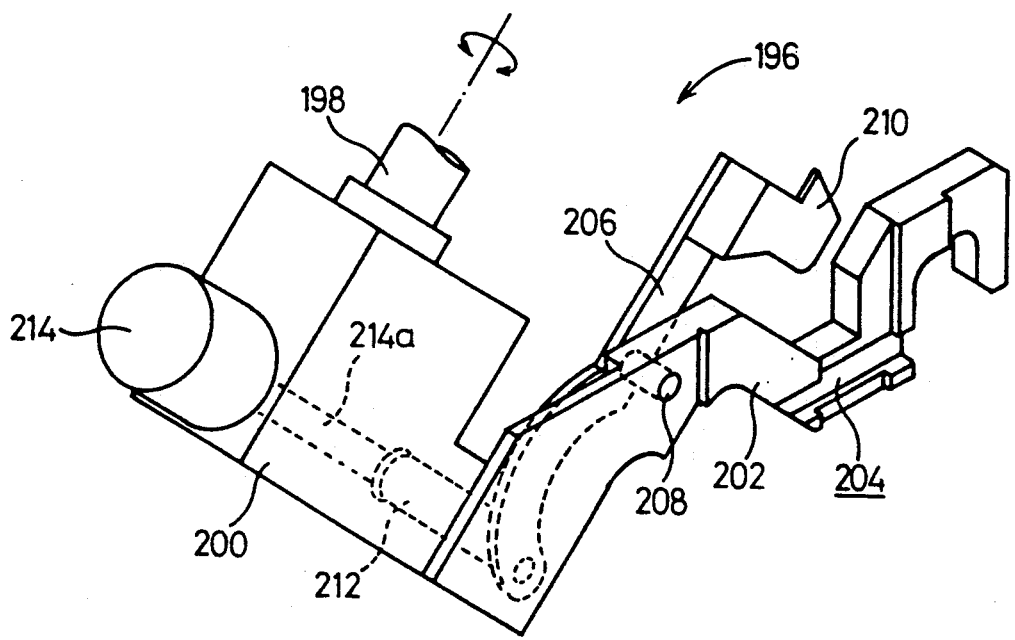
FIG. 14 is a perspective view of a gripping mechanism in a pickup unit.

The gripping mechanism 196 is illustrated in detail in FIG. 14. A gripping member 202 especially designed for gripping a case gasket 30 is fixed to a bracket 200 mounted on a rotatable shaft 198 coupled to a motor (not shown). The gripping member 202 has a slot 204 defined therein for engaging a case gasket 30. A gripping lever 206 is swingably supported on the gripping member 202 by means of a pin 208, and a separator 210 is attached to the distal end of the gripping lever 206. The other end of the gripping lever 206 is operatively coupled via a link 212 to a piston rod 214a extending from a cylinder 214 serving as a drive source.

Figure 15:
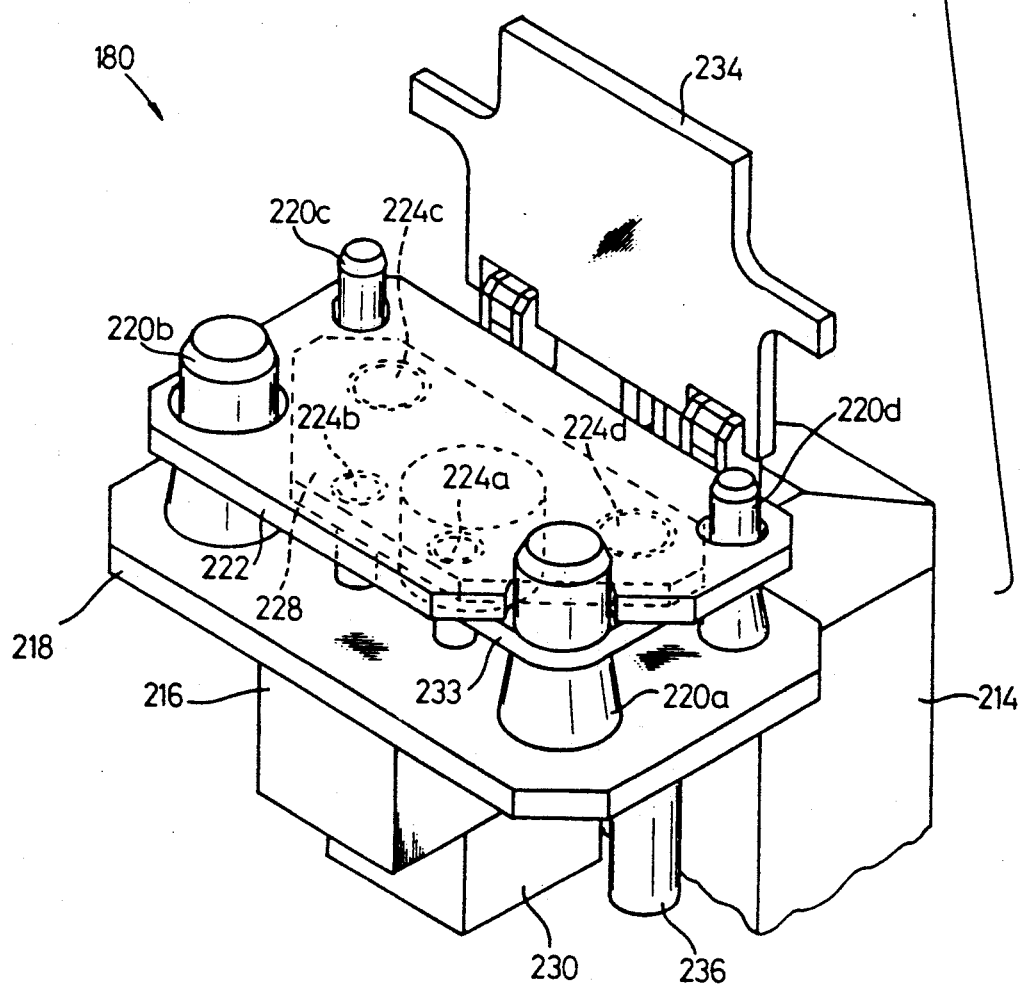
FIG. 15 is a perspective view of an alignment unit for correcting the shape of a case gasket.
Figure 16:
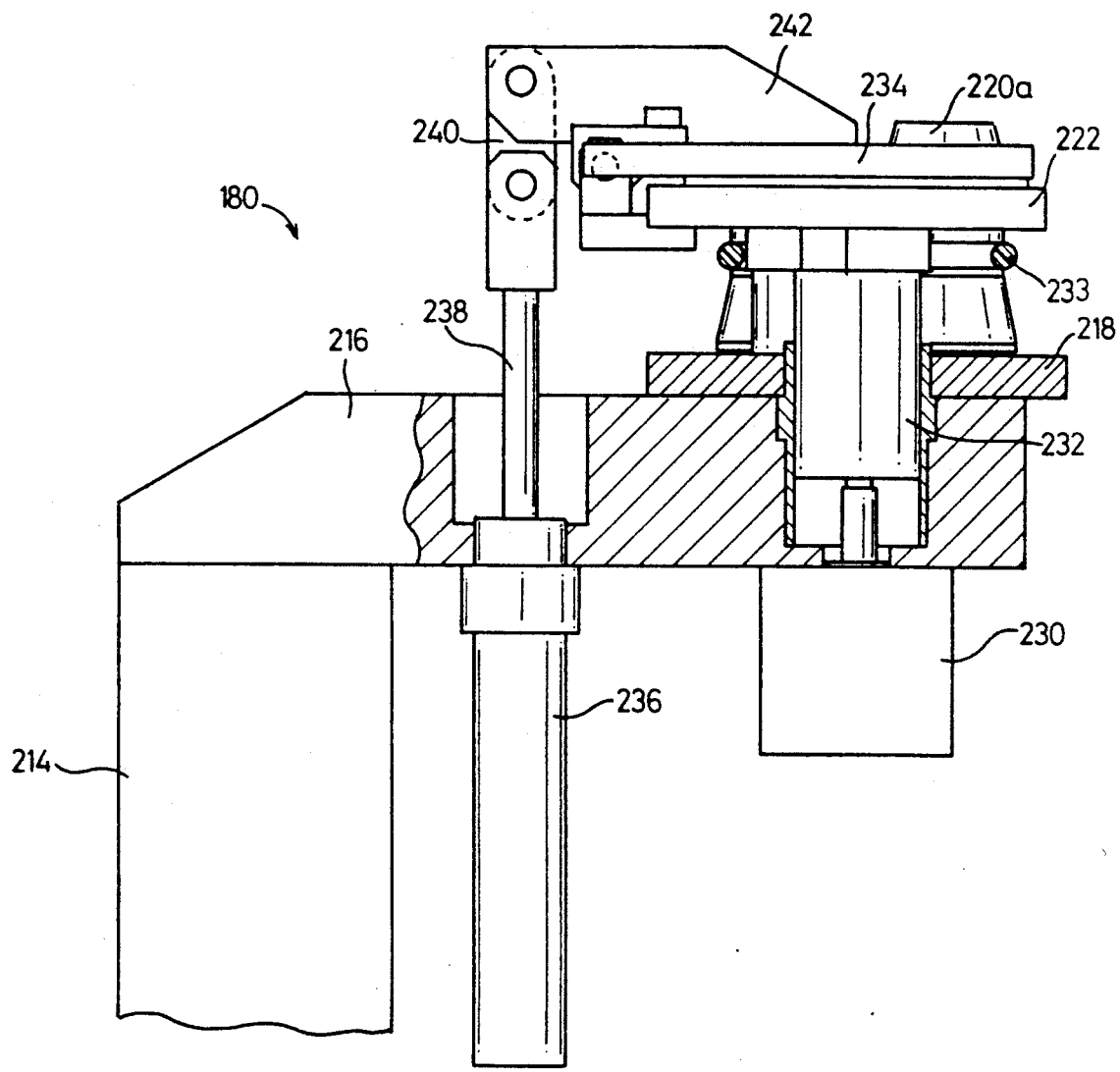
FIG. 16 is a side elevational view, partly in cross section, of the alignment unit.

FIG. 15 shows in detail the alignment unit 180 for correcting the shape of the case gasket 30. FIG. 16 also shows the alignment unit 180 in side elevation, partly in cross section, and FIG. 17 shows the alignment unit 180 in cross section.

As shown in FIGS. 15 and 16, the alignment unit 180 is mounted on a horizontally extending support beam 216 mounted on the upper distant end of an upstanding frame 214 on the floor. The alignment unit 180 includes a first plate 218 on which four substantially cylindrical gasket tensioning members 220a through 220d are tiltably mounted for contacting the respective inner surfaces of the four corners of a case gasket 30. The gasket tensioning members 220a through 220d have tapered surfaces progressively flaring toward their lower proximal ends on the first plate 218. A second plate 222 is supported above the first plate 218 by columns 224a through 224d mounted on the first plate 218.

Figure 17:
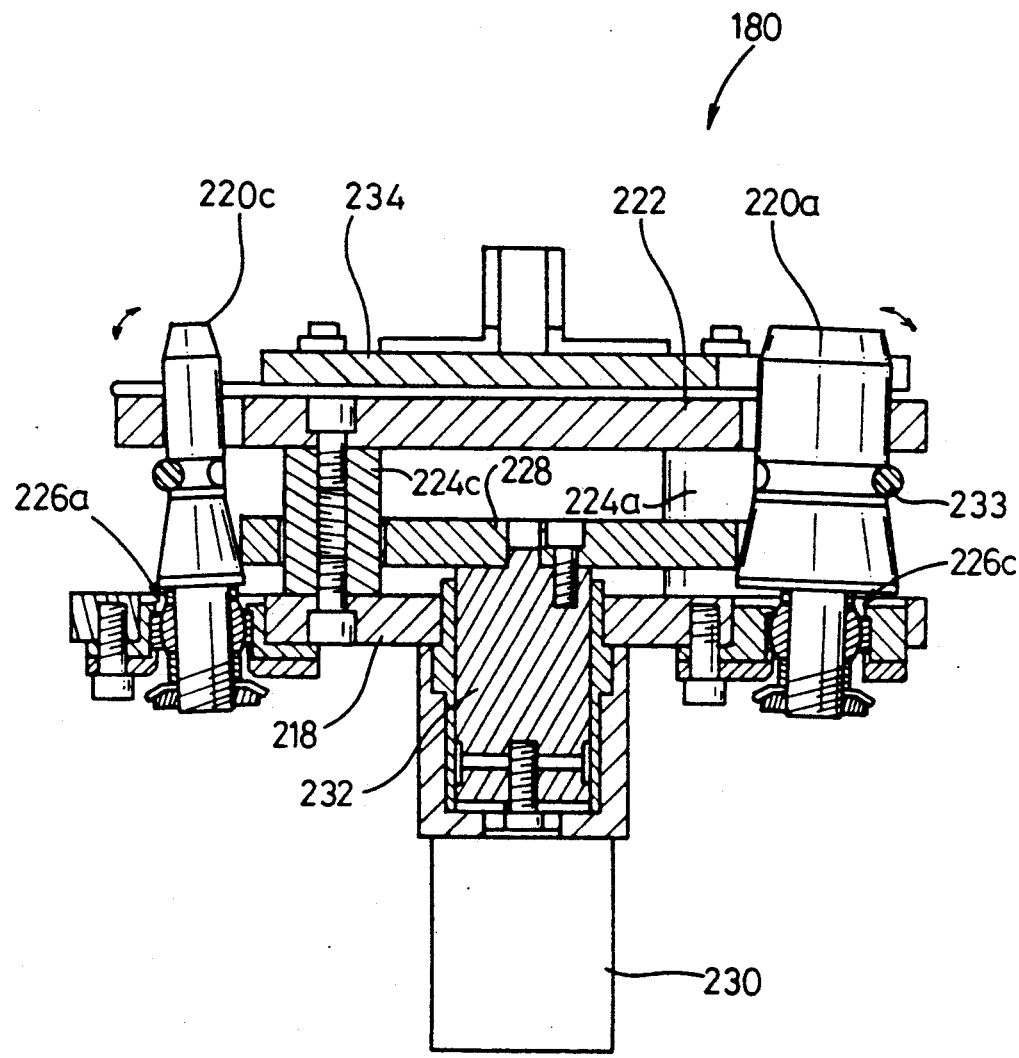
FIG. 17 is a cross-sectional view of the alignment unit.

FIG. 17 clearly shows the manner in which the gasket tensioning members 220a through 220d and the first plate 218 are coupled. The gasket tensioning members 220a through 220d are mounted on the first plate 218 through respective flexible couplings 226a through 226d which allow the gasket tensioning members 220a through 220d to be tilted with respect to the first plate 218 as indicated by the arrows.

Between the first and second plates 218, 222, there is disposed a slide plate 228 (clearly shown in FIG. 17) held in sliding contact with sides of the gasket tensioning members 220a through 220d. The slide plate 228 is operatively joined to a drive source or cylinder 230 through a cylindrical coupling 232 for vertical dispacement. A resilient ring 233 made of a resilient material such as rubber is disposed around and engages the gasket tensioning members 220a through 220d for normally urging them into pressed engagement with the slide plate 228.

As shown in FIG. 16, a presser plate 234 for pressing a case gasket 30 down against the second plate 222 is swingably, i.e., openably and closably, disposed on one side of the second plate 222. The presser plate 234 can be opened and closed by a cylinder 236 mounted on the support beam 216 and having a piston rod 238 operatively connected through a link 240 to a lever 242 joined to the presser plate 234.

Figure 13:
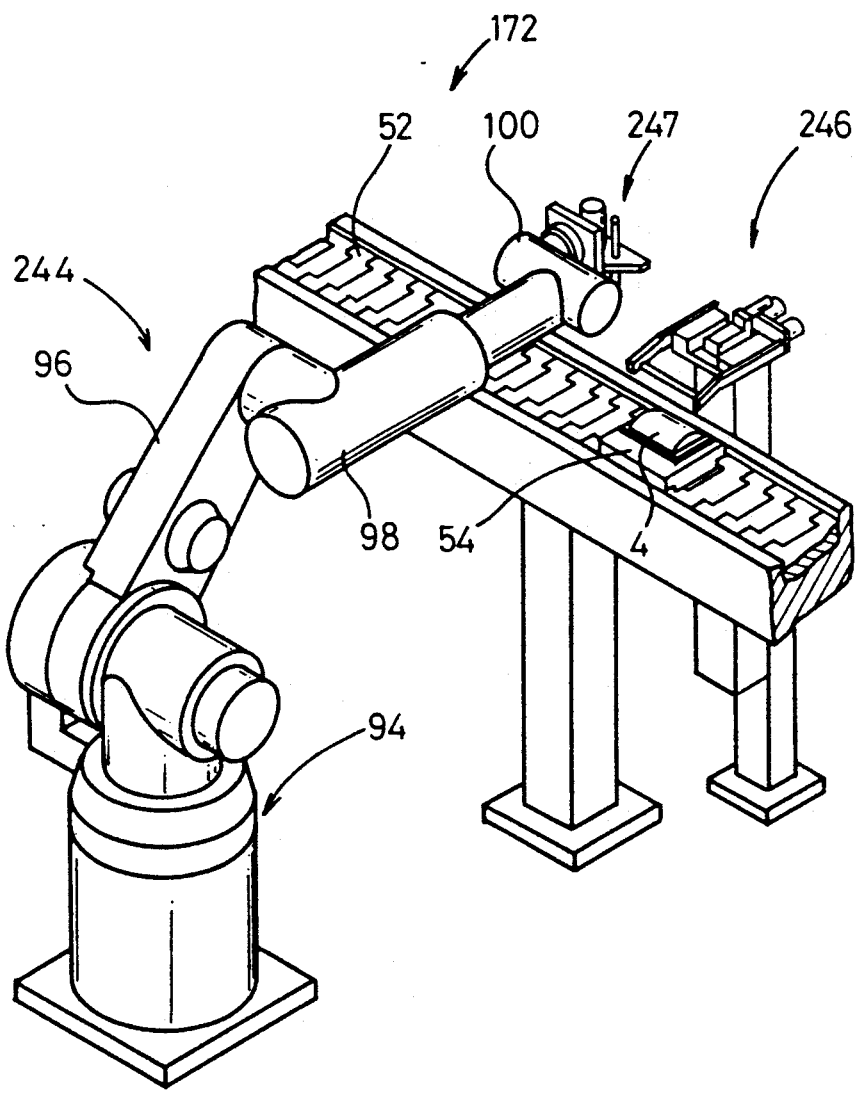
FIG. 13 is a perspective view of a case gasket applicator in the fifth assembling station.

The case gasket applicator 172 operates to set, on the handle case 4, a case gasket 30 which has been corrected in shape by the case gasket supply device 171. As shown in FIG. 13, the case gasket applicator 172 comprises a handling robot 244, and an assisting jig 246 for assisting in holding a case gasket 30 when setting the case gasket 30 on the handle case 4 on the pallet 54.

The handling robot 244 is identical to the handling robot 90 shown in FIG. 6 except for an end effector used thereon.

Figure 18:
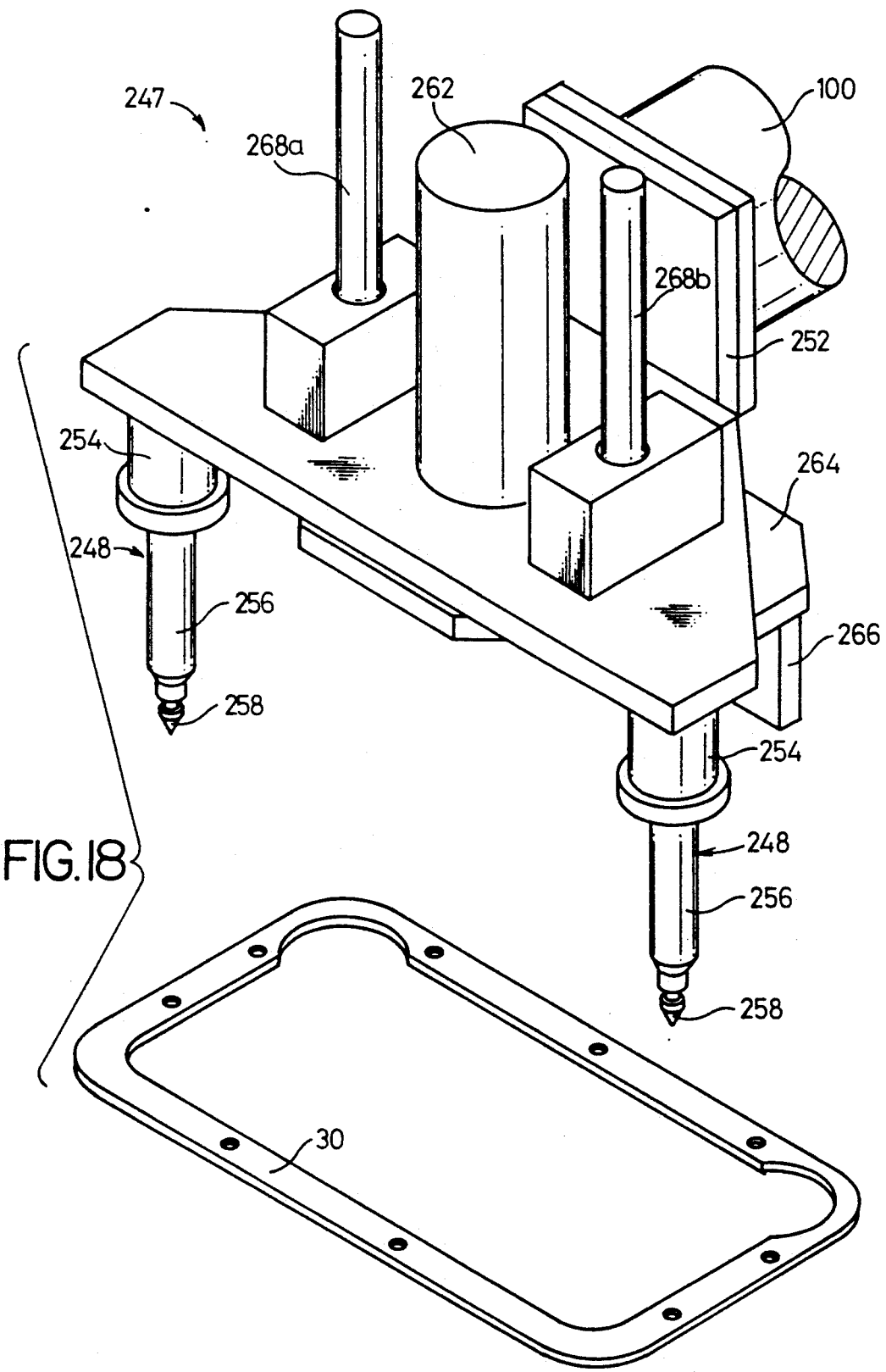
FIG. 18 is a perspective view of an end effector of the handling robot.

FIG. 18 shows an end effector 247 mounted on the wrist 100 of the handling robot 244. The end effector 247 includes three chuck means 248 for holding the corrected case gasket 30 at three points.

The chuck means 248 are actuated by respective chuck opening and closing cylinders 254 fixed to the lower surface of a bracket 242 secured to the wrist 100. From the cylinders 254, there depend respective collet chucks 256 having slits extending from cylindrical portions to conical portions 258 on their lower distal ends. The cylinders 254 have piston rods to which widening members are attached. By lowering the widening members with the cylinders 254, the portions of the chuck means 248 which extend from the distal ends of the collet chucks 256 to the conical portions 258 are spread outwardly or opened to engage in holes defined in the case gasket 30.

Figure 19:
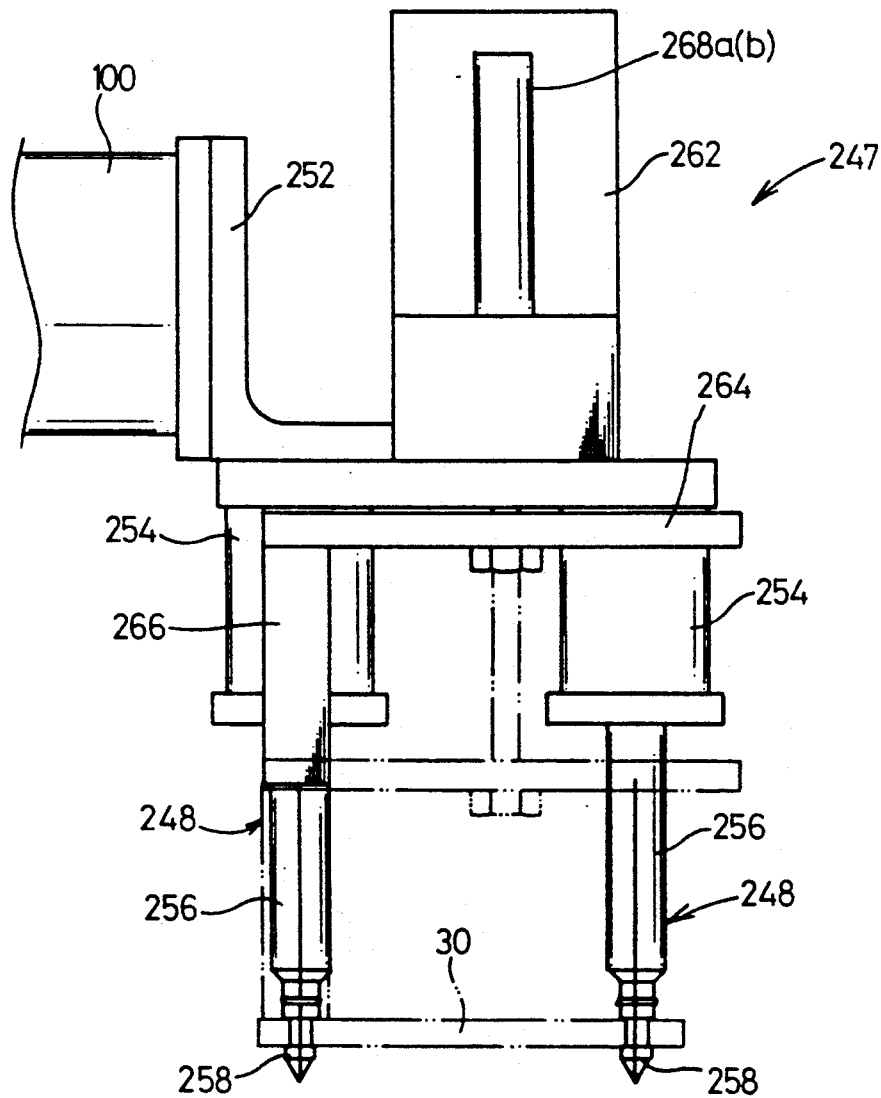
FIG. 19 is a side elevational view of the end effector.

The end effector 247 is also shown in side elevation in FIG. 19. As illustrated in FIG. 19, a cylinder 262 is mounted centrally on the upper surface of the bracket 252 and has a piston rod to which there is fixed a plate 264 with a presser member 266 attached thereto for pressing a case gasket 30. Guide bars 268a, 268b are affixed to the plate 264 for guiding the presser member 266 when it is displaced by the cylinder 262.

Figure 20:
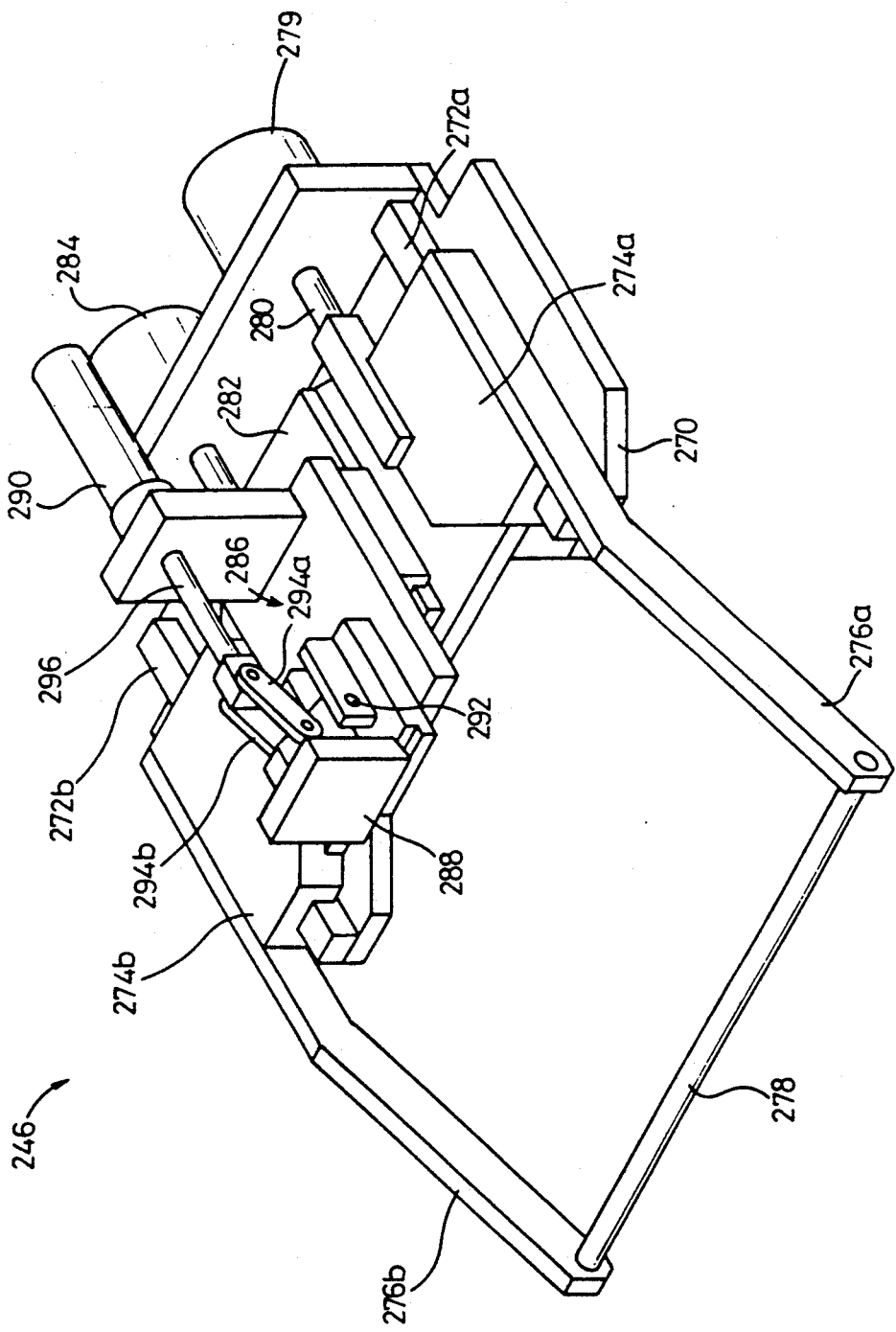
FIG. 20 is a perspective view of an assisting jig of the case gasket applicator.
Figure 21:
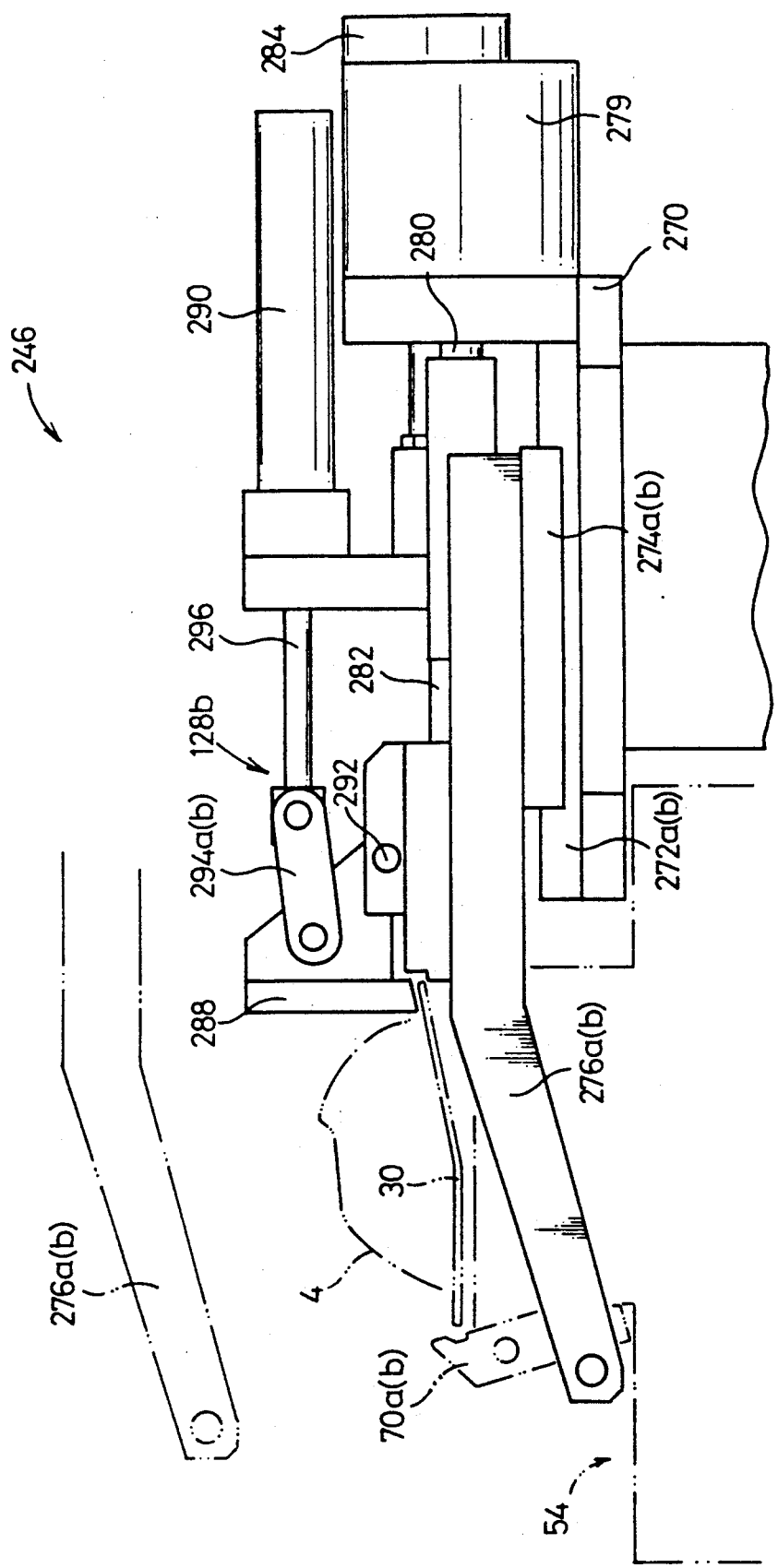
FIG. 21 is a side elevational view of the assisting jig.

The assisting jig 246 is shown in FIGS. 20 and 21. The assisting jig 246 includes two parallel guide rails 272a, 272b attached to opposite ends of a surface plate 270 mounted on a lifting and lowering means (not shown), and sliders 274a, 274b slidably fitted over the guide rails 272a, 272b and to which a pair of respective arms 276a, 276b are fixed. A clamp release lever 278 for pressing the clamping members 70a, 70b of the pallet 54 for unclamping the clamping members 70a, 70b is secured at its opposite ends to the distal ends of the arms 276a, 276b. The clamp release lever 278 is movable back and forth by a cylinder 279 disposed behind the assisting jig 246 and having a piston rod 280 coupled to the slider 274a through a joint.

A guide plate 282 is disposed on the surface plate 270 between the guide rails 272a, 272b. A gasket holding mechanism 286 is movably disposed on the guide plate 282 and displaceable along the guide plate 282 by a cylinder 284. The gasket holding mechanism 286 has a presser member 288 for pressing one end of a case gasket 30 and a cylinder 290 for actuating the presser member 288. The presser member 288 is angularly movably supported by a pin 292 and operatively coupled to a piston rod 296 of the cylinder 290 through a pair of links 294a, 294b.

The fifth assembling station 45 thus constructed will operate as follows:

As shown in FIG. 13, after the assembling steps in the second and third assembling stations 42, 43 have been completed, the pallet 54 is delivered to the fifth assembling station 45 by the conveyor 52, and then stopped in the fifth assembling station 45.

Prior to describing a process of mounting a case gasket 30 on the handle case 4 on the pallet 54, operation of the case gasket supply device 171 for supplying a case gasket 30 to the handling robot 244 will be described.

As shown in FIG. 12, one of case gaskets 30 on one of the magazine racks 182 in the gasket magazine unit 176 is separated and fed, one at a time, by the gripping mechanism 196 of the pickup unit 178. More specifically, the cylinder 189 of the pickup unit 178 is actuated to raise the unit body 190 to a predetermined position in which the ball screw 194 is rotated about its own axis by the motor 192 to move the gripping mechanism 196 forwardly (to the right in FIG. 12). When the gripping mechanism 196, together with the guide bar 197 fitted in the unit body 190, reaches the position indicated by the solid lines in FIG. 12, the rotation of the ball screw 194 is stopped.

In the position shown in FIG. 12, the gripping mechanism 196 contacts a case gasket 30, a portion of which is fitted in the slot 204 in the gripping member 202. Since the gripping mechanism 196 horizontally approaches the case gasket 30 which depends vertically, the movement of the gripping member 202 to engage the case gasket 30 can be facilitated. Then, the cylinder 214 is operated to turn the gripping lever 206 to cause the separator 210 to separate one case gasket 30 from the other case gaskets 30. The separated case gasket 30 is held between the separator 210 and the gripping member 202. A non-illustrated motor is energized to turn the gripping mechanism 196 through about 270° in the direction of the arrow in FIG. 12 to remove the case gasket 30 from the bars 186a, 186b and to hold the case gasket 30 in a horizontal plane. With the case gasket 30 thus held, the motor 192 is energized to move the gripping mechanism 196 forwardly into the position indicated by the two dot-and-dash lines in FIG. 12 for thereby setting the case gasket 30 on the alignment unit 180. When the case gasket 30 is to be set on the alignment unit 180, the gripping lever 206 of the gripping mechanism 196 is opened, and at the same time the gripping mechanism 196 itself is slightly lowered by the cylinder 189, thus placing the case gasket 30 on the alignment unit 180. After all the case gaskets 30 have been fed from one magazine rack 182, the next magazine rack 182 is moved into a position for coaction with the gripping mechanism 196. The magazine racks 182 are thus successively intermittently moved in a loop for uninterruptedly supplying case gaskets 30.

The alignment unit 180 corrects the case gasket 30 into a flat shape. The case gasket 30 is corrected in shape since case gaskets 30 may not be uniform in thickness and may be locally deformed for some reasons, and deformed case gaskets 30 might cause problems. Operation of the alignment unit 180 will be readily understood from FIGS. 16 and 17.

More specifically, the piston rod 238 of the cylinder 236 is extended to turn down the presser plate 234 to press the case gasket 30 against the second plate 222. The case gasket 30 is forcibly sandwiched between the second plate 222 and the presser plate 234. As shown in FIG. 17, the slide plate 228 is lowered by the cylinder 230. Since the slide plate 228 has been held in abutment against the sides of the gasket tensioning members 220a through 220d, the downward movement of the slide plate 228 causes the gasket tensioning members 220a through 220d, which engage the four corners of the case gasket 30, to be tilted radially outwardly because the slide plate 228 slidably engages the downwardly flaring surfaces of the gasket tensioning members 20a through 220d. Therefore, the case gasket 30 is radially outwardly tensioned forcibly into a flat configuration. Then, the presser plate 234 is lifted to allow the corrected case gasket 30 to be fed to a next process. At this time, the case gasket 30 remains tensioned by the gasket tensioning members 220a through 220d, and the tensioned case gasket 30 is gripped by the handling robot 44.

FIG. 18 shows the manner in which the case gasket 30 on the alignment unit 180 is held by the end effector 247 mounted on the wrist 100 of the handling robot 244. More specifically, the handling robot 244 is moved along a learned path to enable the end effector 247 to approach the case gasket 30 on the alignment unit 180 along a predetermined path. Then, the conical portions 258 on the distal ends of the collet chucks 256 of the three chuck means 248, respectively, on the end effector 246 are inserted into corresponding holes defined in the case gasket 30. The chuck opening and closing cylinders 254 are then actuated to open the collet chucks 256, whereby the case gasket 30 is held at three points while being tensioned radially outwardly. Therefore, the case gasket 30 is prevented from being distorted or deformed when it is mounted on the handle case 4.

In FIG. 13, the handling robot 244 installs the case gasket 30 on the handle case 4 on the pallet 54 which is held at rest in the fifth assembling station 45. At this time, the assisting jig 246 for assisting the handling robot 244 in installing the case gasket 30 operates in the manner described below with reference to FIGS. 20 and 21.

The assisting jig 246 which is disposed on a lifting and lowering means (not shown) is initially held such that the arms 276a, 276b supporting the clamp release lever 278 are in an elevated position represented by the two-dot-and-dash lines in FIG. 21. The lifting and lowering means is then operated to lower the assisting jig 246 until the clamp release lever 278 reaches a position at the same height as that of the lower ends of the clamping members 70a, 70b of the pallet 54, whereupon the downward movement of the assisting jig 246 is stopped. Thereafter, the cylinder 279 is operated to retract the arms 276a, 276b toward the assisting jig 246 for bringing the clamp release lever 278 between the arms 276a, 276b into engagement with the clamping members 70a, 70b and turning the clamping members 70a, 70b away from the handle case 4. The clamping members 70a, 70b are disengaged from the handle case 4 because if the clamping members 70a, 70b remained in engagement with the peripheral flange surface of the handle case 4, the clamp members 70a, 70b would be in the way when setting the case gasket 30 on the handle case 4.

Then, the handling robot 244 places the case gasket 30 held by the end effector 247 on the handle case 4 on the pallet 54. At this time, in order to reliably separate the case gasket 30 from the collet chucks 256 of the end effector 247, the presser member 266 of the end effector 247 is lowered by the cylinder 262 as soon as the case gasket 30 is positioned slightly above the handle case 4. Now, the case gasket 30 is pressed against the handle case 4 (see FIG. 19). Substantially concurrent with this, the assisting jig 246 operates as follows:

The gasket holding mechanism 286 of the assisting jig 246 is moved forwardly to a predetermined position by the cylinder 284. The presser member 288 of the gasket holding mechanism 286 is turned about the pin 292 by the cylinder 290 to the portion of the case gasket 30 which is opposite to the portion thereof that is pressed by the presser member 266 of the end effector 247. Thus, the case gasket 30 is reliably disengaged from the collet chucks 256 and the protrusions 32 on the handle case 4 are fitted respectively in the small holes in the case gasket 30. The mounting of the case gasket 30 on the handle case 4 is now completed.

Figure 22:
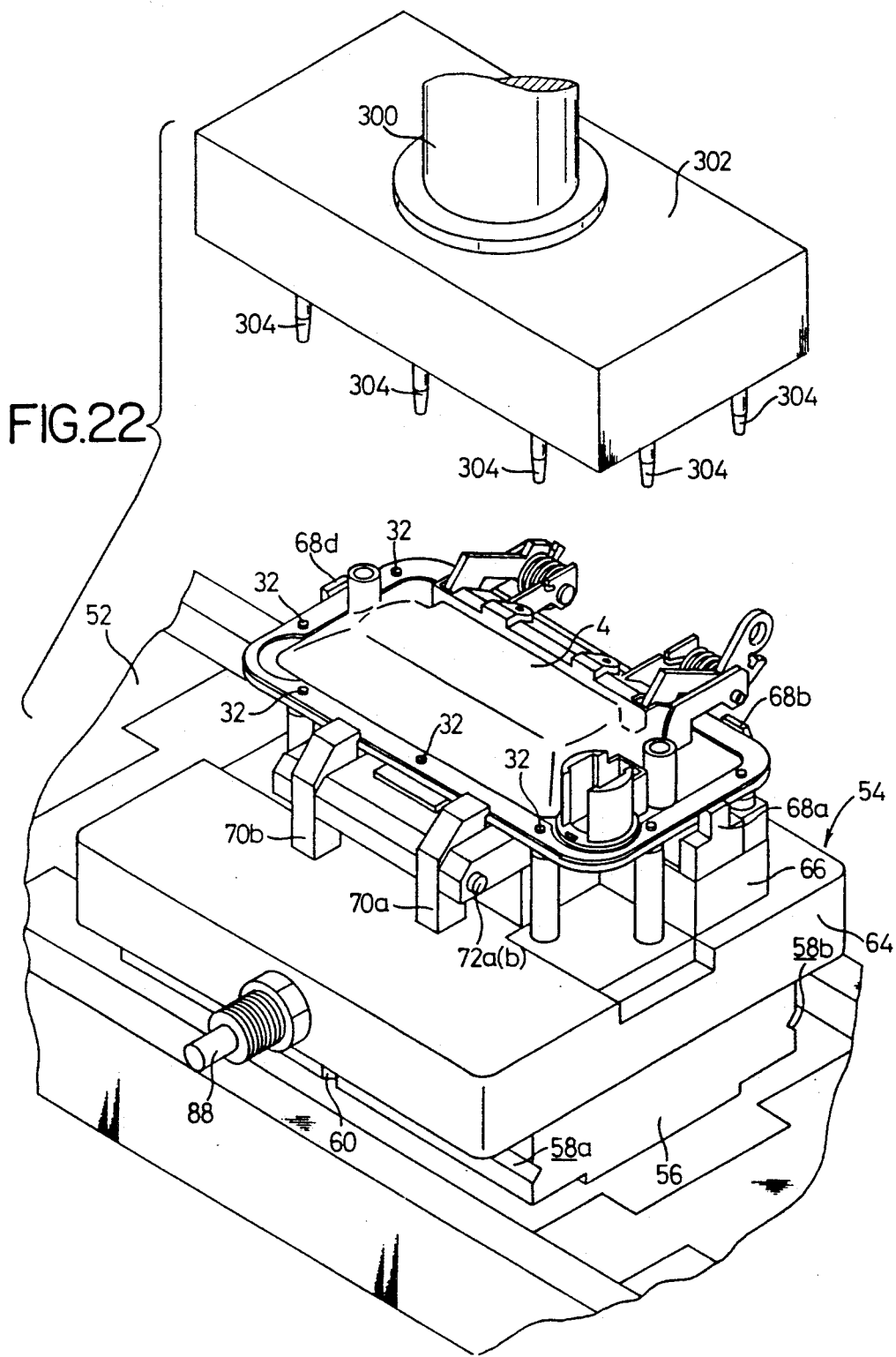
FIG. 22 is a perspective view of a device for fixing a case gasket in a sixth assembling station.

After the case gasket 30 has been set on the handle case 4 in the fifth assembling station 45, the protrusions 32 are deformed by staking in the sixth assembling station 46 to fix the case gasket 30 to the handle case 4. FIG. 22 fragmentarily shows a device for fixing a case gasket.

A holder block 302 mounted on the lower distal end of a rod 300 which is coupled to a drive source (not shown) for vertical displacement supports a number of staking tools or punches 304 on its lower surface for deforming the protrusions 32 on the flange surface of the handle case 4. The process of fixing the case gasket 30 to the handle case 4 is completed when the holder block 302 is lowered by the drive source to enable the staking tools 304 to deform the corresponding protrusions 32.

In the next seventh assembling station 47, the ends of the hinge pins 8a, 8b which have been mounted on the door handle assembly 2 in the second and third assembling stations 42, 43 are deformed or flattened to retain these hinge pins 8a, 8b on the door handle assembly 2 against dislodgment. This assembling step is carried out by a device shown in FIG. 23.

Figure 23:
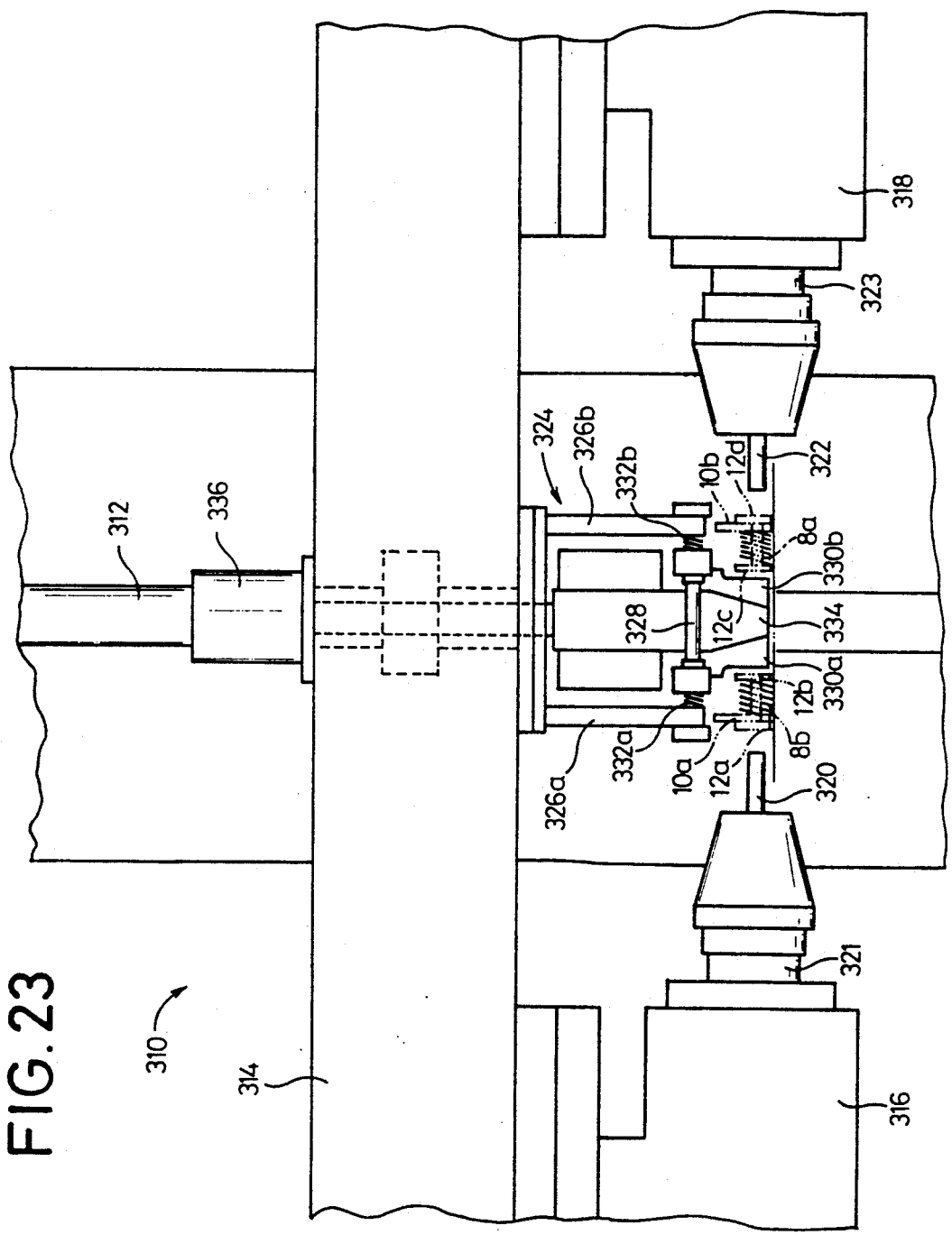
FIG. 23 is a side elevational view of a device for staking hinge pins in a seventh assembling station.

In FIG. 23, a hinge pin staking device 310 includes a rod 312 extending from a cylinder (not shown), a horizontal beam 314 coupled to the rod 312, and a pair of staking mechanisms 316, 318 mounted on the lower surface of the horizontal beam 314 and movable horizontally toward and away from each other. The staking mechanisms 316, 318 have motors (not shown) for moving these respective staking mechanisms horizontally, and cylinders 321, 323 for extending respective punches 320, 322 on confronting distal ends thereof.

A backup mechanism 324 is mounted centrally on the lower surface of the horizontal beam 314 for engaging and holding inner ends of the hinge pins 8a, 8b when the other outer ends thereof are flattened respectively by the punches 320, 322. The backup mechanism 324 includes a bar 328 disposed between and mounted on distal ends of support plates 326a, 326b, and a pair of abutting members 330a, 330b slidably fitted over the bar 328. The abutting members 330a, 330b have distal ends which are normally urged toward each other by coil springs 332a, 332b. Between the abutting members 330a, 330b, there is fitted a wedge member 334 tapered or progressively narrower toward the distal end thereof. The wedge member 334 is movable back and forth by a cylinder 336 mounted on the upper surface of the horizontal beam 314.

When the pallet 54 arrives at the seventh assembling station 47, the hinge pin staking device 310 operates as follows: The horizontal beam 314 is lowered by a non-illustrated drive source until the staking mechanisms 316, 318 reach the position shown in FIG. 23. Then, the cylinder 336 is actuated to lower the wedge member 334 which causes the abutting members 330a, 330b to abut against the hinge pins 8a, 8b. Thereafter, the punches 320, 322 of the staking mechanisms 316, 318 are extended by the respective cylinders 321, 323 to stake the outer ends of the hinge pins 8a, 8b. The hinge pins 8a, 8b can be effectively staked since the opposite inner ends of the hinge pins 8a, 8b are backed up by the abutting members 330a, 330b.

Figure 24:
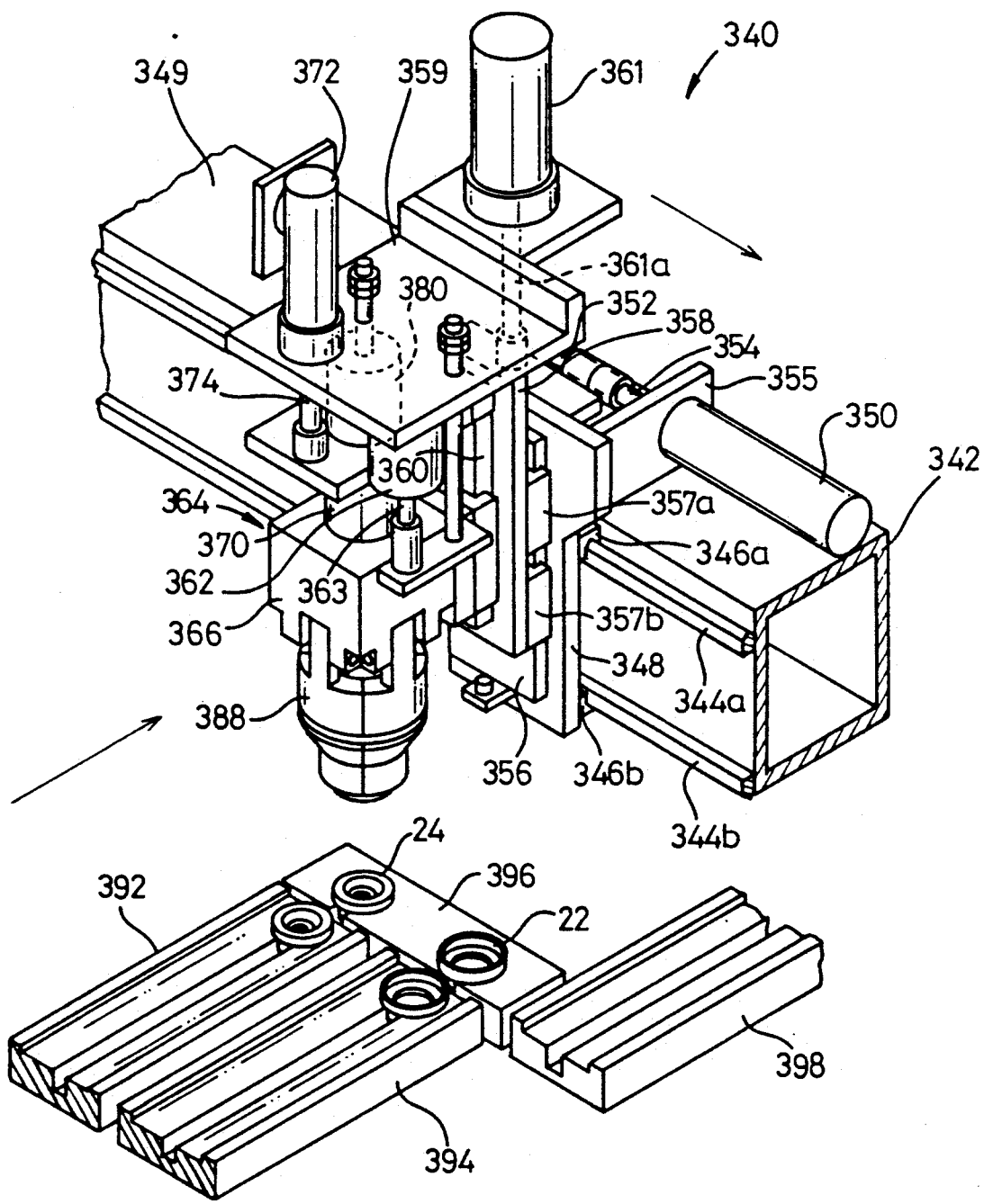
FIG. 24 is a perspective view of a device for superposing key guard assembly components in a fifth assembling station.

Subsequently, the key guard assembly 20 is mounted on the handle case 4 in the eighth assembling station 48. FIG. 24 shows a device in the eighth assembling station 48 for superposing the gasket 22 and the gasket cap 24 into the key guard assembly 20.

As shown in FIG. 24, a device 340 for superposing key guard assembly components includes a horizontal beam 342 extending from a base (not shown) and supporting a pair of parallel rails 344a, 344b extending horizontally along the beam 342. Sliders 346a, 346b slidably mounted respectively on the rails 344a, 344b are integrally attached to a first support plate 348. Confronting cylinders 349, 350 are disposed on he beam 342, the cylinder 349 being fixed to the beam 342. The cylinder 349 has a piston rod 352 coupled to the piston rod 354 of the cylinder 350 which is integrally secured to the first support plate 348 by a bracket 355. Therefore, the various structural components and a superposing mechanism (described later) are horizontally displaceable by the cylinders 349, 350.

To the first support plate 348, there is fixed a guide plate 356 over which sliders 357a, 357b integral with a second support plate 358 are slidably fitted. A superposing mechanism 364 (described later) is disposed on the second support plate 358. An attachment plate 359 is affixed to the upper end of the second support plate 358.

A cylinder 361 mounted on the attachment plate 359 has a piston rod 361a secured to the first support plate 348. Therefore, the second support plate 358 and the superposing mechanism 364 are vertically displaceable with respect to the first support plate 348 in response to operation of the cylinder 361. The superposing mechanism 364 has a body 366 slidably engaging a guide plate 360 mounted on the second support plate 358.

Figure 25:
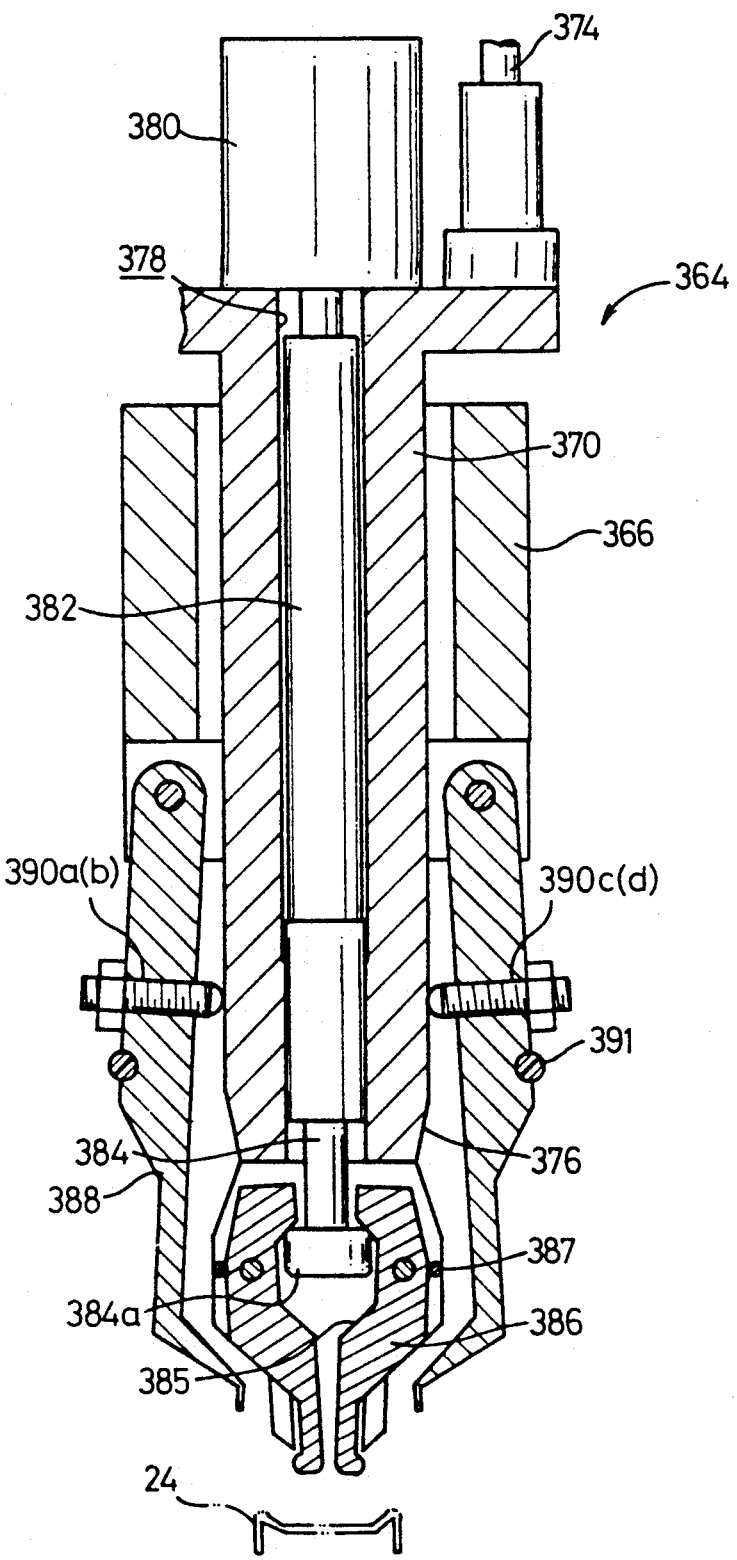
FIGS. 25 through 27 are cross-sectional views showing an operation sequence of a superposing mechanism in the superposing device.
Figure 26:
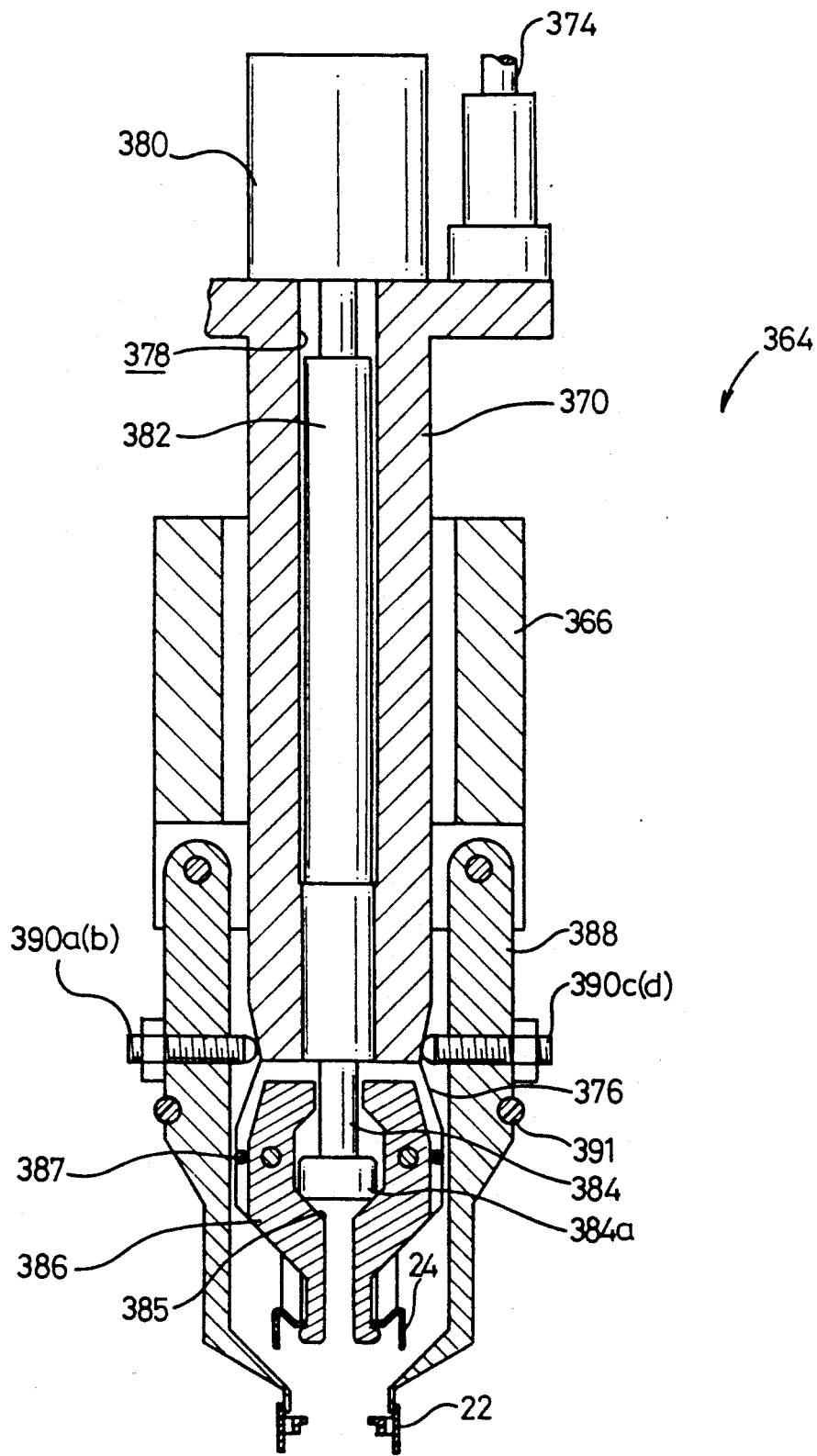
Figure 27:
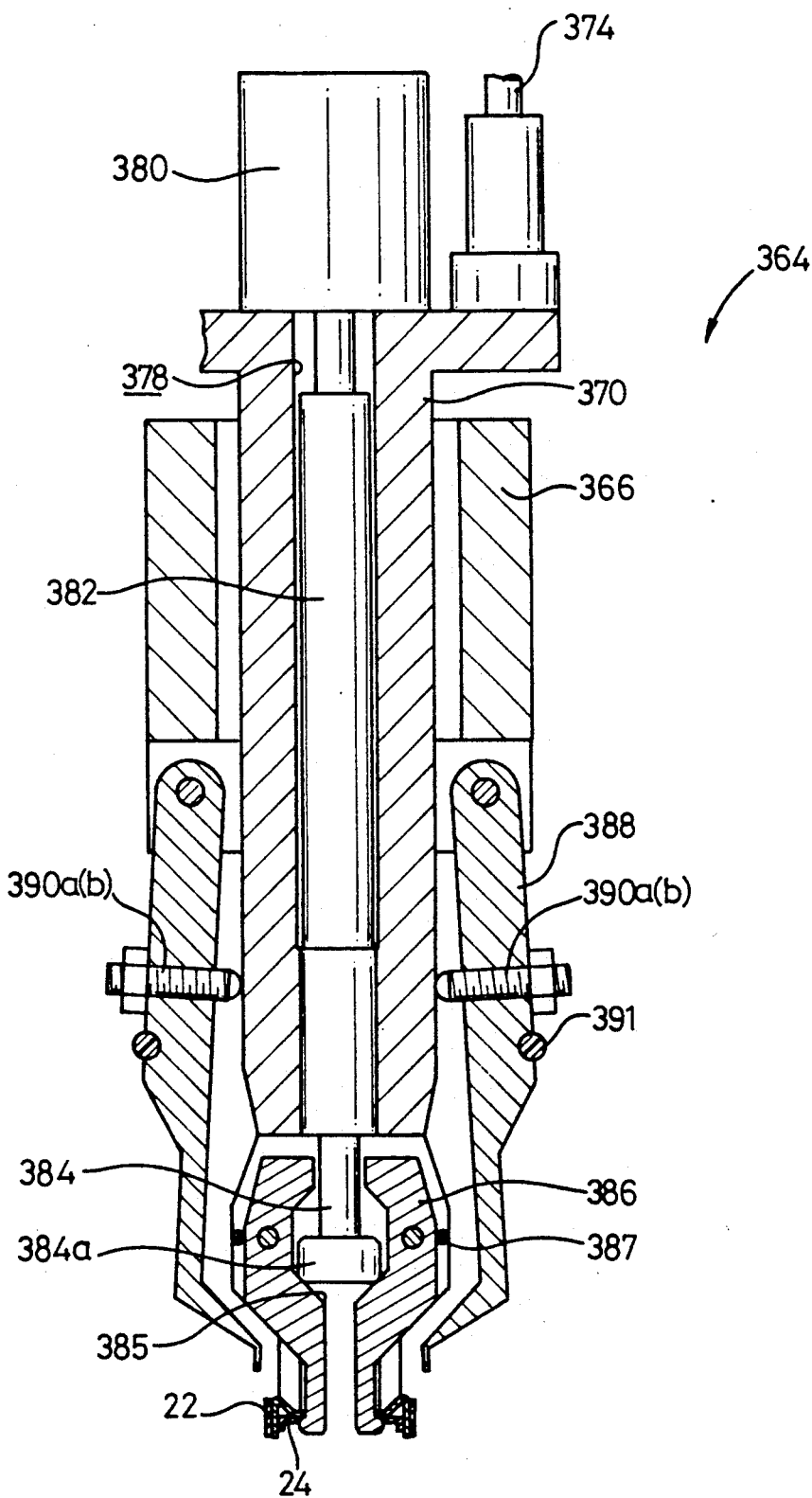

FIGS. 25 through 27 show the superposing mechanism 364 in detail. The superposing mechanism 364 includes the body 366, and the piston rod 363 of a first cylinder 362 (FIG. 24) fixed to the attachment plate 359 is coupled to the body 366. A cylindrical member 370 is loosely fitted in the body 366 and has an upper end connected to the piston rod 374 of a second cylinder 372. The cylindrical member 370 has on its lower portion a tapered surface 376 which is progressively narrower in diameter in the downward direction. The cylindrical member 370 has a hole 378 defined coaxially therethrough, and a rod 382 connected to a third cylinder 380 mounted on the cylindrical member 370 for opening and closing a collet chuck is inserted through the hole 378. The rod 382 has a lower distal end on which a collet widening member 384 with a larger-diameter portion 384a on its lower distal end is coaxially mounted.

A first collet chuck 386 is mounted on the lower end of the cylindrical member 370. A resilient ring 387 is disposed around the first collet chuck 386 for resiliently contracting the first collet chuck 386 radially inwardly. The first collet chuck 386 has an inner tapered surface 385 which is engageable by the collet widening member 384. When the collet widening member 384 is downwardly displaced on and along the tapered surface 385 (FIG. 26), the first collet chuck 386 is spread or opened radially outwardly against the resiliency of the resilient ring 387. The outside diameter of the lower distal end of the first collet chuck 386 is slightly smaller than the inside diameter of the gasket cap 24 of the key guard assembly 20.

A second collet chuck 288 is mounted on the lower end of the body 366 concentrically with the first collet chuck 386 in surrounding relation thereto. Cam rods 390a through 390d are threaded in a central portion of the second collet chuck 388 and have distal ends engaging the tapered surface 376 of the cylindrical member 370. Upon relative displacement of the cylindrical member 370 and the body 366, the cam rods 390a through 390d are brought into engagement with an outer circumferential surface of the cylindrical member 370 which is larger in diameter than the tapered surface 376 to open or spread the second collet 388. A resilient O-ring 391 is disposed around the second collet 388 for normally contracting the same radially inwardly.

As illustrated in FIG. 24, first feed passages 392, 394 are disposed below the key guard superposing device 340 for supplying a gasket 22 and a gasket cap 24 from a parts feeder (not shown) to the key guard superposing device 340. The first feed passages 392, 394 are vibrated by a vibrator (not shown) to deliver gaskets 22 and gasket caps 24 slowly in the direction of the arrow. A workpiece table 396 which is vertically movable by a lifting and lower means (not shown) such as a cylinder is positioned at the ends of the first feed passages 392, 394 for receiving thereon a gasket 22 and a gasket cap 24. A second feed passage 398 is disposed adjacent to the workpiece table 396 for feeding a completed key guard assembly 20 to a next process. The second feed passage 298 extends to a position near a handling robot (FIG. 28) which will be described below.

Figure 28:
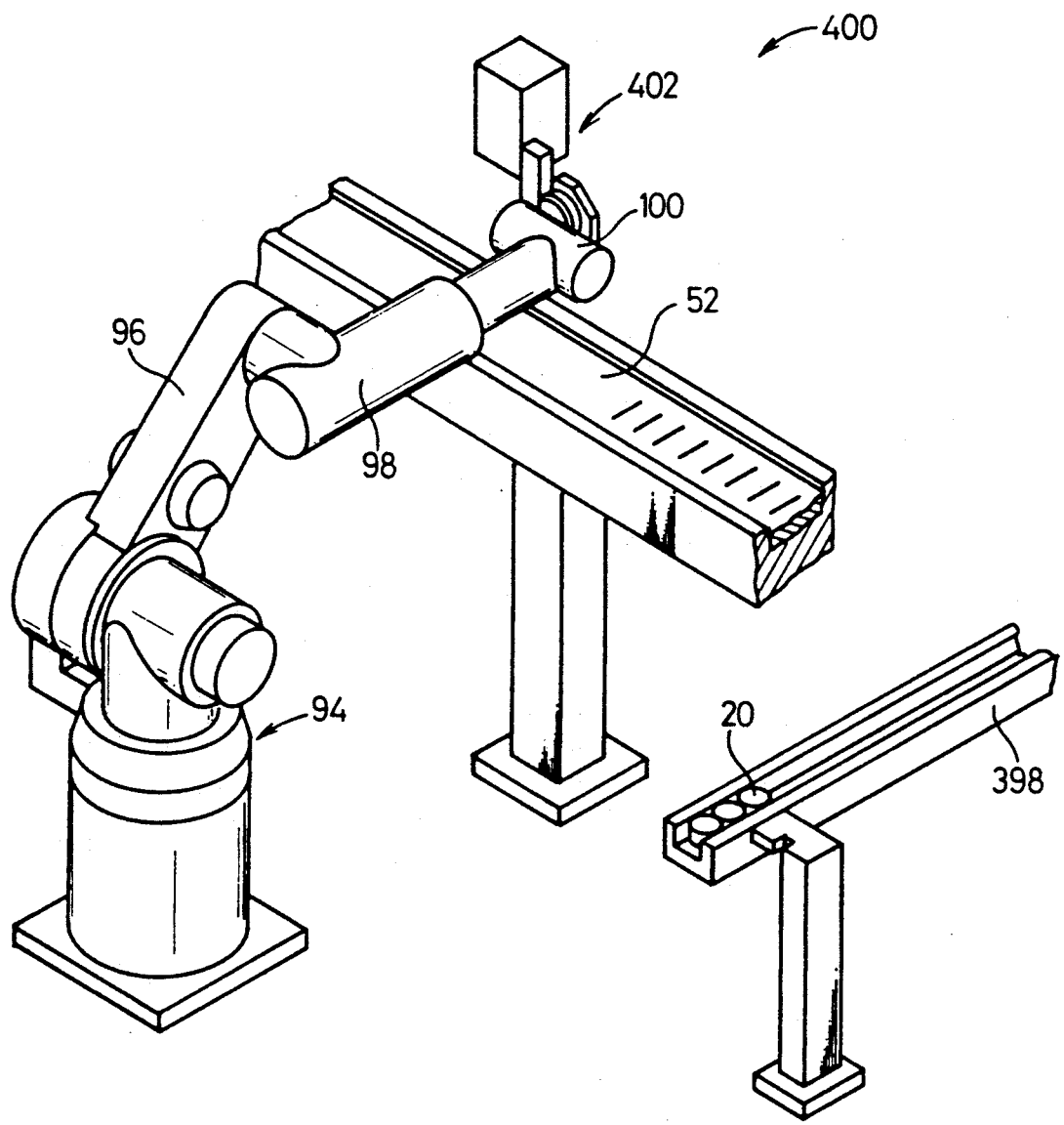
FIG. 28 is a perspective view of a handling robot in an eighth assembling station.

FIG. 28 shows a handling robot 400 which is identical to the handling robots that have been described so far except for an end effector. The components of the handling robot 400 are therefore denoted by identical reference numerals and will not be described in detail.

Figure 29:
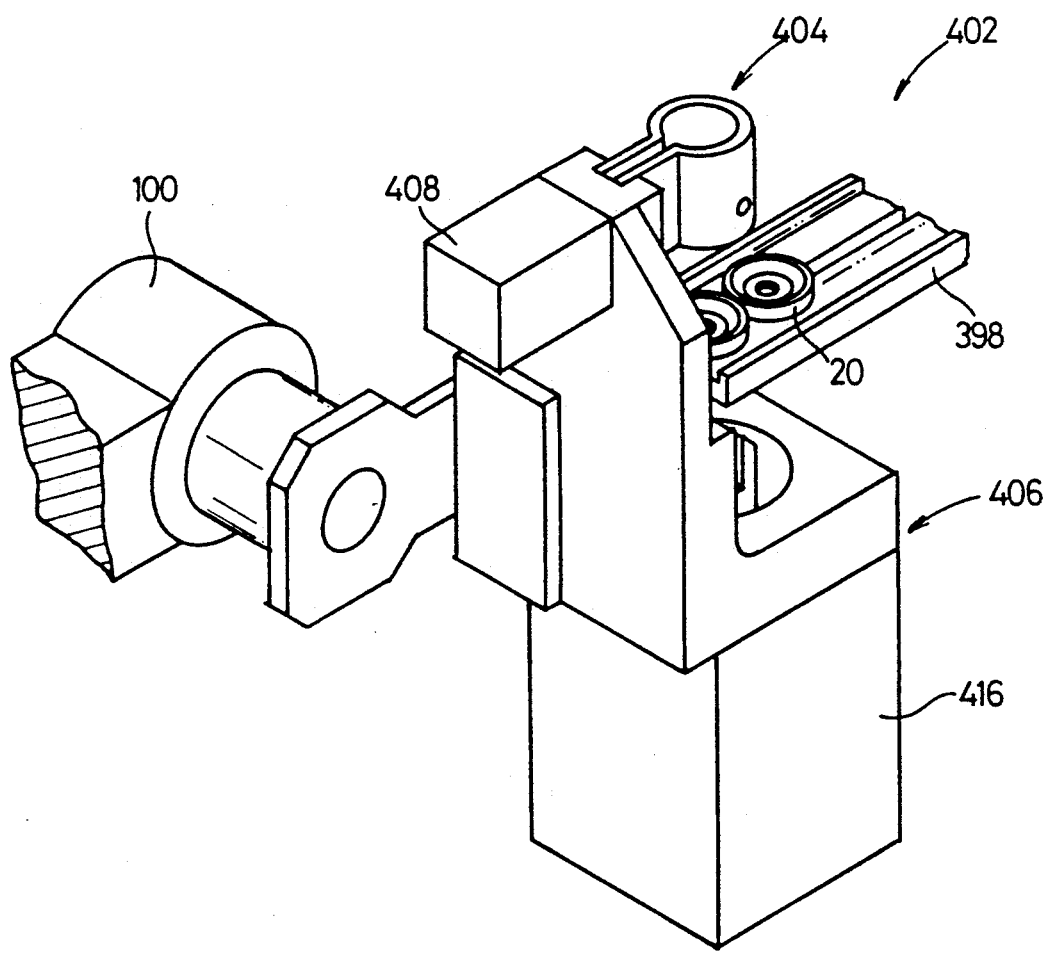
FIG. 29 is a perspective view of an end effector of the handling robot illustrated in FIG. 28.
Figure 30A:
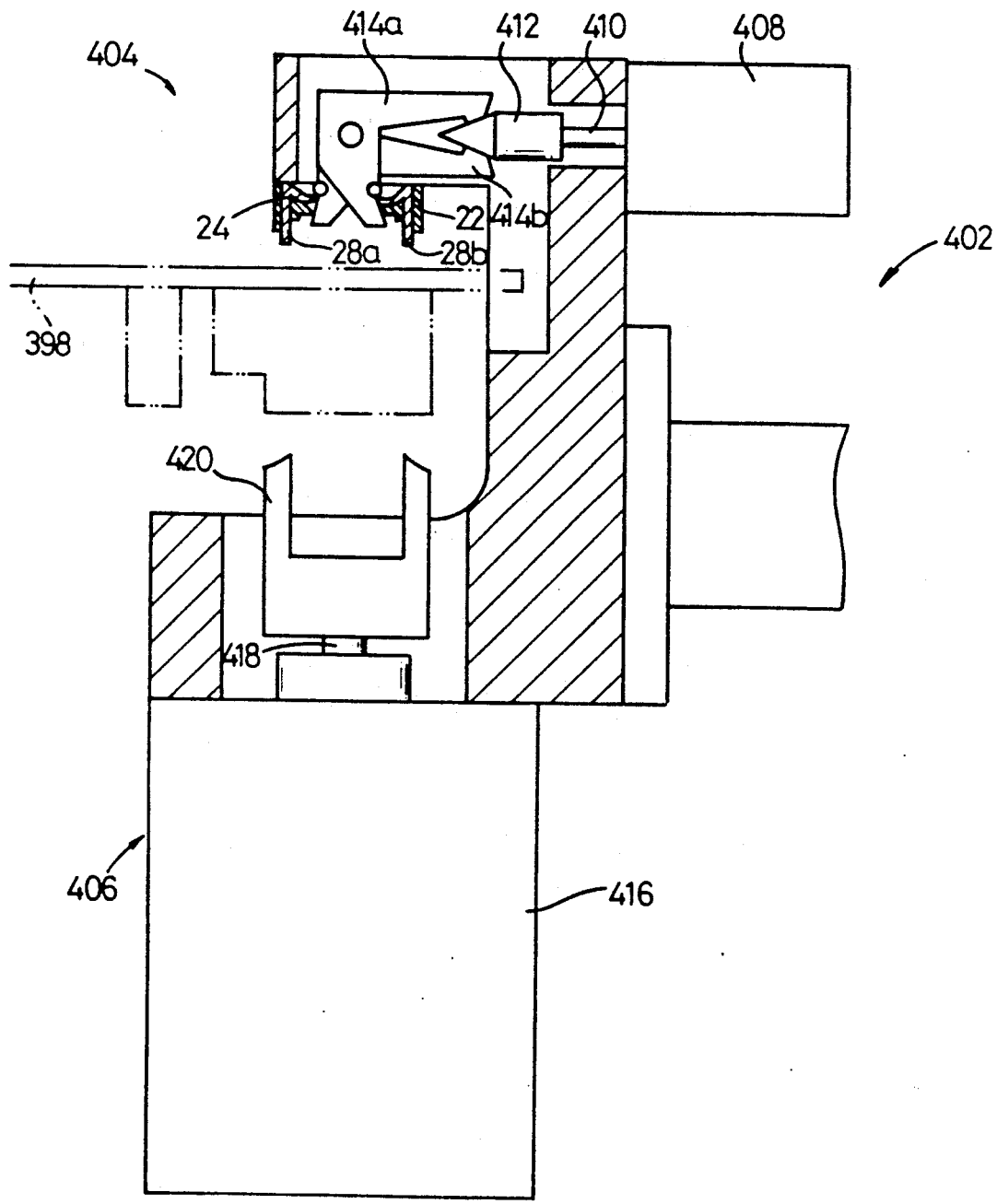

FIG. 29 illustrates an end effector 402 mounted on the wrist 100 of the handling robot 400. The end effector 402 comprises a chuck means 404 for gripping and picking up a key guard assembly 20 which has been fed along the second feed passage 398, and a staking means 406 for inserting the key guard assembly 20 into a handle case 4 and staking the key guard assembly 20 fixedly on the handle case 4. FIGS. 30a and 30b show the end effector 402 in detail.

The chuck means 404 includes a cylinder 408 having a piston rod 410 on which there is mounted a pusher member 412 that is tapered toward its distal end. The pusher member 412 is disposed near ends of holder levers 414a, 414b which are openably and closably coupled to each other, for opening the other ends of the holder levers 414a, 414b. The staking means 406 has a drive source 416 comprising a cylinder and a staking tool 420 mounted on the distal end of the piston rod 418 of the cylinder 416 for bending the tongues 28a, 28b of a gasket cap 24 to fix the key guard assembly 20 to the handle case 4.

Before describing the operation of the handling robot 404 in the eighth assembling station 48 to install the key guard assembly 20, operation of the key guard superposing device 340 shown in FIG. 24 will be described below.

In FIG. 24, gaskets 22 and gasket caps 24 are fed respectively on and along the first feed passages 392, 394 to the workpiece table 396. When one gasket 22 and one gasket cap 24 reach the workpiece table 396, the workpiece table 396 is elevated to a predetermined working position by a cylinder (not shown). At this time, the superposing mechanism 394 of the key guard superposing device 340 is positioned directly above the gasket cap 24 on the workpiece table 396.

The second cylinder 372 of the key guard superposing device 340 is then operated to extend its piston rod 387. As shown in FIG. 25, the first collet chuck 386 mounted on the lower distal end of the cylindrical member 370 coupled to the piston rod 374 now projects out of the second collet 388. At this time, the cylindrical member 370 is lowered relative to the body 366, so that the cam rods 390a through 390d are relatively moved from the tapered portion 376 onto the larger-diameter outer circumferential surface of the cylindrical member 370. Consequently, the second collet chuck 388 is opened to allow the first collet chuck 386 to project out of the second collet chuck 388.

Then, the cylinder 361 is actuated to retract the piston rod 361a thereof in FIG. 24. As a result, the second support plate 358 coupled to the cylinder 361 through the attachment plate 359 is lowered while being guided by the guide plate 356. The superposing mechanism 364 mounted on the second support plate 358 is therefore caused to descend for receiving the gasket cap 24 placed on the workpiece table 396.

After the lower end of the first collet chuck 386 has been positioned in the gasket cap 24, the rod 382 extending from the third cylinder 380 is lowered to cause the larger-diameter portion 384a of the collet widening member 384 to slide on and along the inner tapered surface 385 of the first collet chuck 386 to open or spread the first colet chuck 386. As a consequence, the gasket cap 24 is held by the first collet chuck 386. The gasket cap 24 is subsequently continuously retained by the first collet chuck 386.

With the gasket cap 24 held by the first collet chuck 386, the piston rod 374 of the second cylinder 372 is retracted to elevate the cylindrical member 370, and at the same time the piston rod 363 of the first cylinder 362 is extended to lower the body 366 coupled to the piston rod 363, thereby drawing the first collet chuck 386 into the second collet chuck 388. The piston rod 361a of the cylinder 361 is extended to ift the superposing mechanism 364 in its entirety. Then, the superposing mechanism 364 is displaced laterally along the beam 342 in the direction of the arrow. More specifically, the piston rod 352 of the cylinder 349 is extended and the piston rod 354 of the cylinder 350 which confronts the cylinder 349 is retracted. The superposing mechanism 364 is now moved along the beam 342 into a position directly above the gasket 22 on the workpiece table 396, while being guided along the rails 344a, 344b.

When the superposing mechanism 346 arrives at the position above the gasket 22, it is stopped and then displaced downwardly by the cylinder 361. The cylinder 361 is shut off when the lower distal end of the second collet chuck 288 on the lower end of the body 366 is positioned within the gasket 22. Thereafter, the piston rod 374 of the second cylinder 372 is extended to cause the cam rods 390a through 390d to slide on and along the tapered surface 376 of the cylindrical member 370 to open or spread the second collet chuck 388. The gasket 22 is now securely held and simultaneously spread slightly radially outwardly (see FIG. 26). Continued extension of the piston rod 374 brings the first collect chuck 386 out of the second collet chuck 388 to position the gasket cap 24 held by the first collet chuck 386 in superposing relation to the gasket 22. The first cylinder 362 is operated to elevate the body 366 with respect to the cylindrical member 370, whereupon the second collet chuck 388 is released from the gasket 22 (see FIG. 27). In this manner, the gasket 22 and the gasket cap 24 can reliably be superposed with respect to each other by relatively displacing the first and second collet chucks 386, 388 which are vertically displaceable and concentrically arranged.

Subsequently, the superposing mechanism 364 is caused to ascend by the cylinder 361 and moved laterally along the beam 342 in the direction of the arrow to deliver the key guard assembly 20 held by the first collet chuck 386 to the position directly above the second feed passage 398. The superposing mechanism 364 is thereafter moved downwardly, and the rod 382 coupled to the third cylinder 380 is elevated to displace the larger-diameter portion 384a of the collet widening member 384 out of engagement with the tapered surface 385 of the first collet chuck 386. The first collet chuck 386 is contracted radially inwardly under the resiliency of the resilient ring 387 to release the key guard assembly 20, which then drops onto the second feed passage 398.

The key guard assembly 20 is supplied along the second feed passage 398 to a position near the handling robot 400 (FIG. 28). The handling robot 400 picks up supplied key guard assemblies 20 one at a time from the end of the second feed passage 398, and sets the picked-up key guard assembly 20 on the workpieces on the pallet 40.

As shown in FIGS. 29, 30a, and 30b, the end effector 402 on the wrist 100 of the handling robot 400 holds a key guard assembly 20 as follows: The end effector 204 is lowered as a whole to move the chuck means 404 toward the key guard assembly 20 positioned on the end of the second feed passage 398. When the lower distal ends of the holder levers 414, 414b of the chuck means 404 are inserted in the key guard assembly 20, the cylinder 408 is actuated to force the pusher member 412 to spread apart the holder levers 414a, 414b, thus firmly holding the key guard assembly 20. Then, the handling robot 400 operates to set the key guard assembly 20 on the handle case 4 on the pallet 54.

As shown in FIG. 30b, the handling robot 400 inserts the key guard assembly 20 upwardly into the handle case 4 on the pallet 54. When the key guard assembly 20 is set in the protective member 18 of the handle case 4, the piston rod 410 is retracted to release the holder levers 414, 414b from the key guard assembly 20. The cylinder 416 of the staking means 406 is then activated to extend the piston rod 418 to cause the staking tool 420 on the piston rod 418 to bend over the tongues 28a, 28b of the gasket cap 24, whereupon the key guard assembly 20 is fixed to the handle case 4. The chuck means 404 and the staking means 406 which are positioned in confronting relation to each other allow the key guard assembly 20 to be inserted and then staked successively.

The above operation of the handling robot 400 is repeated to install key guard assemblies 20 successively supplied from the second feed passage 398 on respective handle cases 4.

Figure 1:
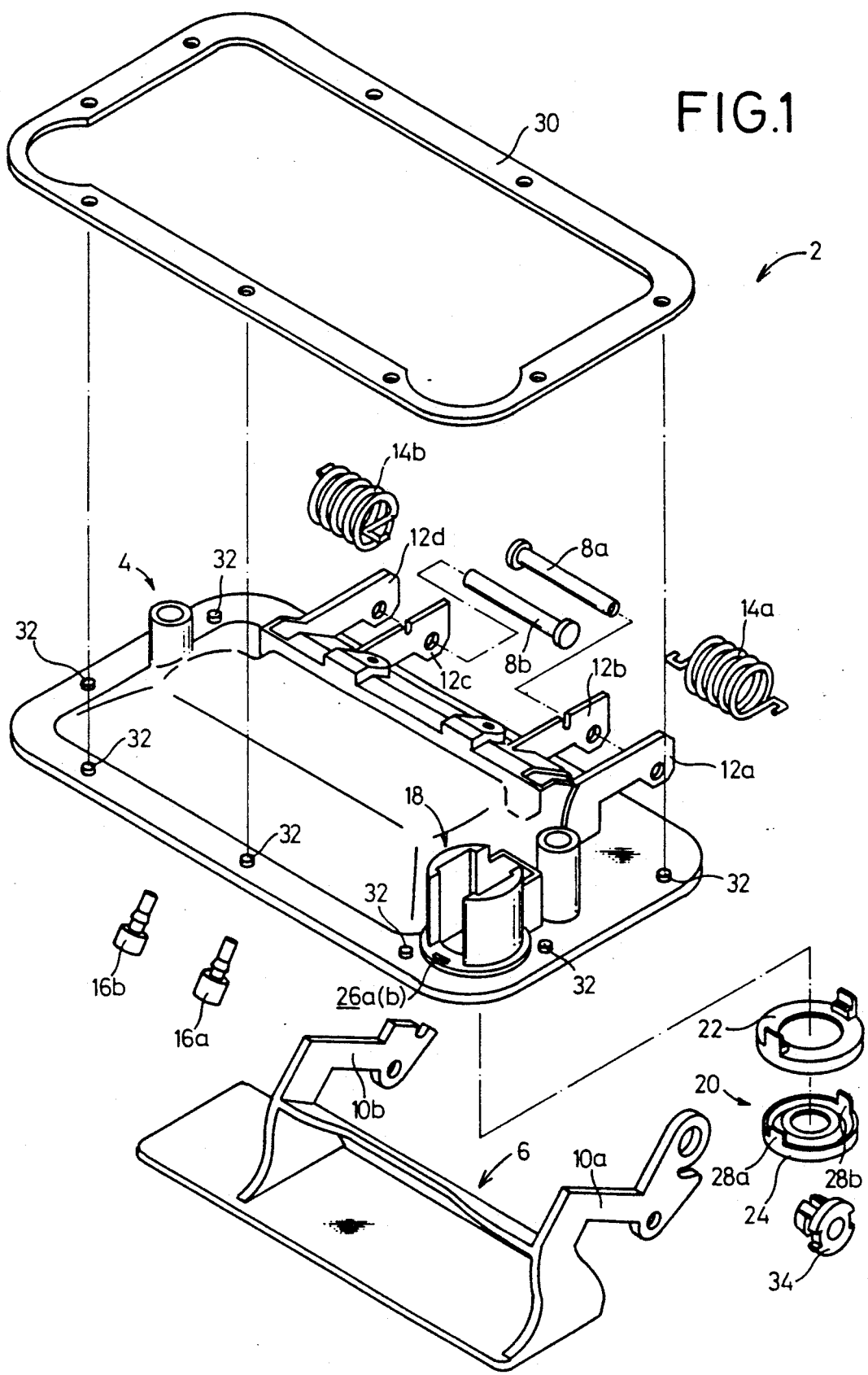
FIG. 1 is an exploded perspective view of a door handle to be assembled by a door handle assembling method and apparatus according to the present invention.

The bushing 34 shown in FIG. 1 is set in place in the ninth assembling station 49. More specifically, the bushing 34 is inserted into the hinge lever 10a of the handle 6 by a handling robot which is identical to the handling robot 90 shown in FIG. 6. Since this process of inserting the bushing 34 into the hinge lever 10a is quite simple, it will not be described in detail.

Finally, the tenth assembling station 50 will be described below. In the tenth assembling station 50, a final assembling step is effected to insert the stoppers 16 into the handle case 4, thereby completing the door handle assembly 2.

The tenth assembing station 50 has an apparatus comprising a handling robot which is substantially the same as the handling robot shown in FIG. 5 except for an end effector, a stopper supply device 500 for supplying stoppers 16 as workpieces to the handling robot, and a jig 502 for assisting the handling robot in inserting the stoppers 16. The stopper supply device 500 is shown in FIG. 31, and the jig 502 is illustrated in FIGS. 32 and 33.

Figure 31:
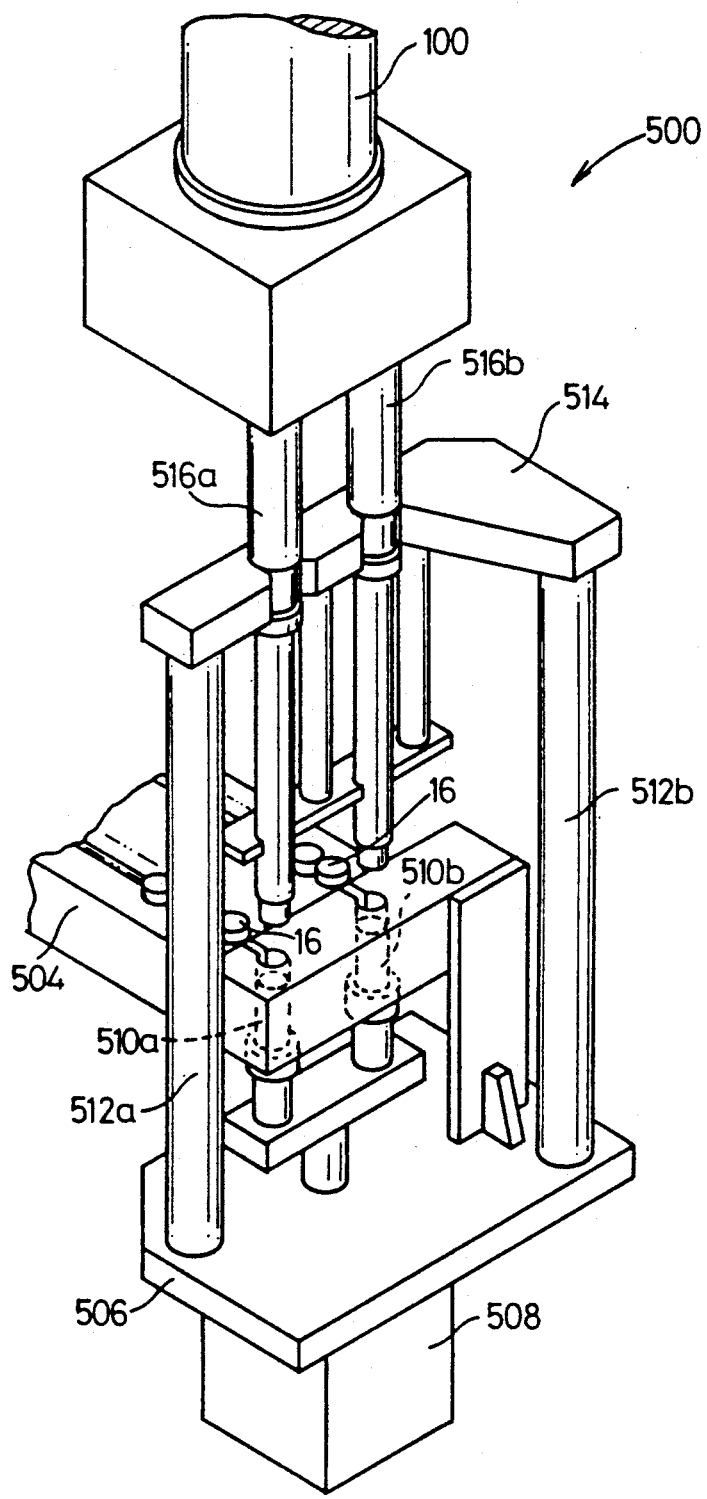
FIG. 31 is a perspective view of a stopper supply device and a handling robot end effector in a tenth assembling station.

In FIG. 31, the stopper supply device 500 is disposed on an installation plate 506 at the terminal end of a feed passage 504 extending from a parts feeder (not shown). A cylinder 508 is fixed to the lower surface of the installation plate 506 and has a piston rod 590 with a distal end thereof connected through a joint to sockets 510a, 510b for receiving two respective stoppers 16. The sockets 510a, 510b are inserted respectively in holes defined in the terminal end of the feed passage 504. After the sockets 510a, 510b have received respective stoppers 16, the sockets 510a, 510b can be vertically moved by the cylinder 508. Two upstanding columns 512a, 512b are mounted on the upper surface of the installation plate 506 and support a positioning plate 514 having two recesses defined therein. Chuck bars 516a, 516b mounted on the wrist 100 of the handling robot engage in the respective recesses of the positioning plate 514. Needles are attached to the lower distal ends of the chuck bars 516a, 516b for piercing and picking up the stoppers 16 from the sockets 510a, 510b.

Figure 32:
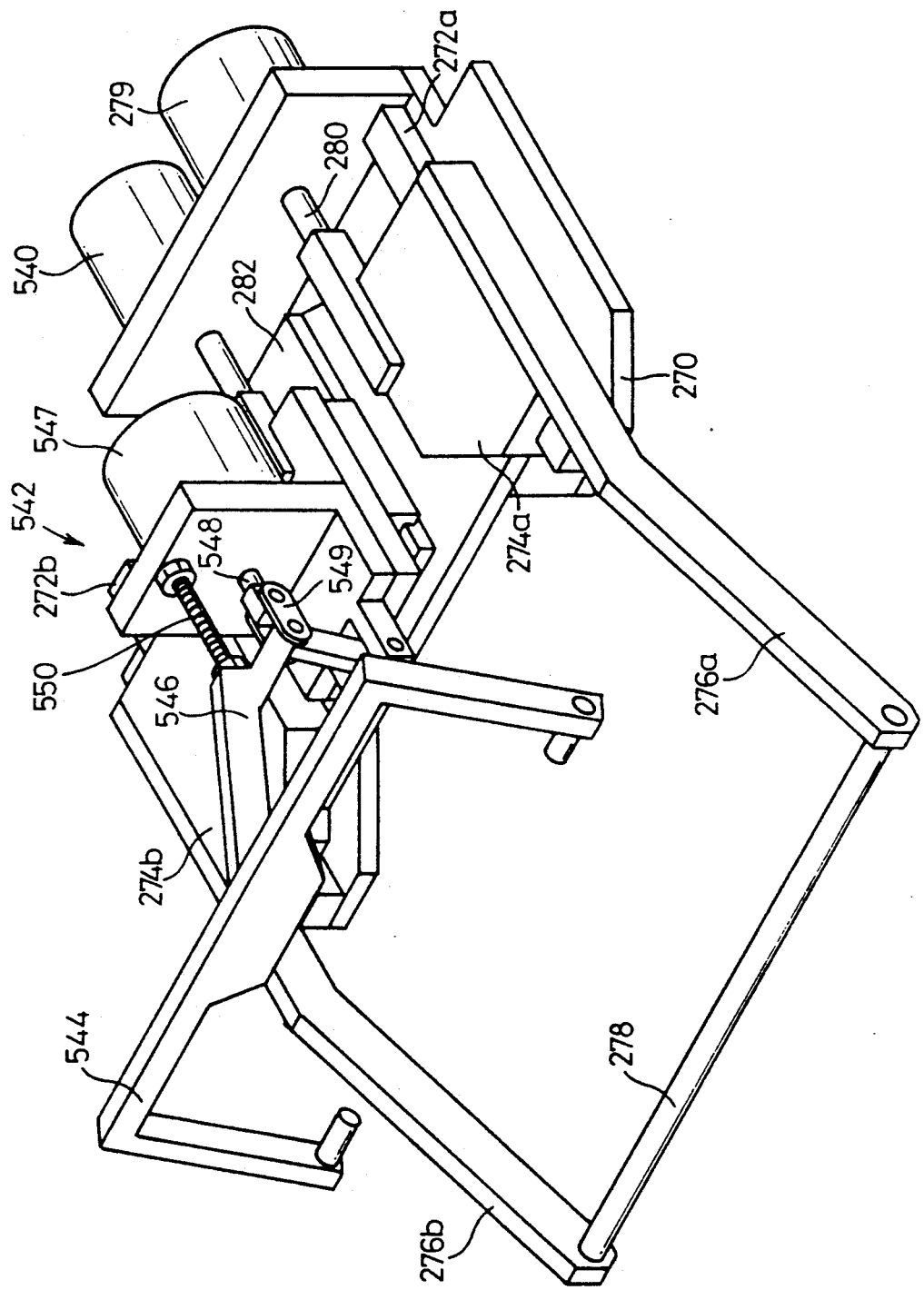
FIG. 32 is a perspective view of a jig in the tenth assembling station.
Figure 33:
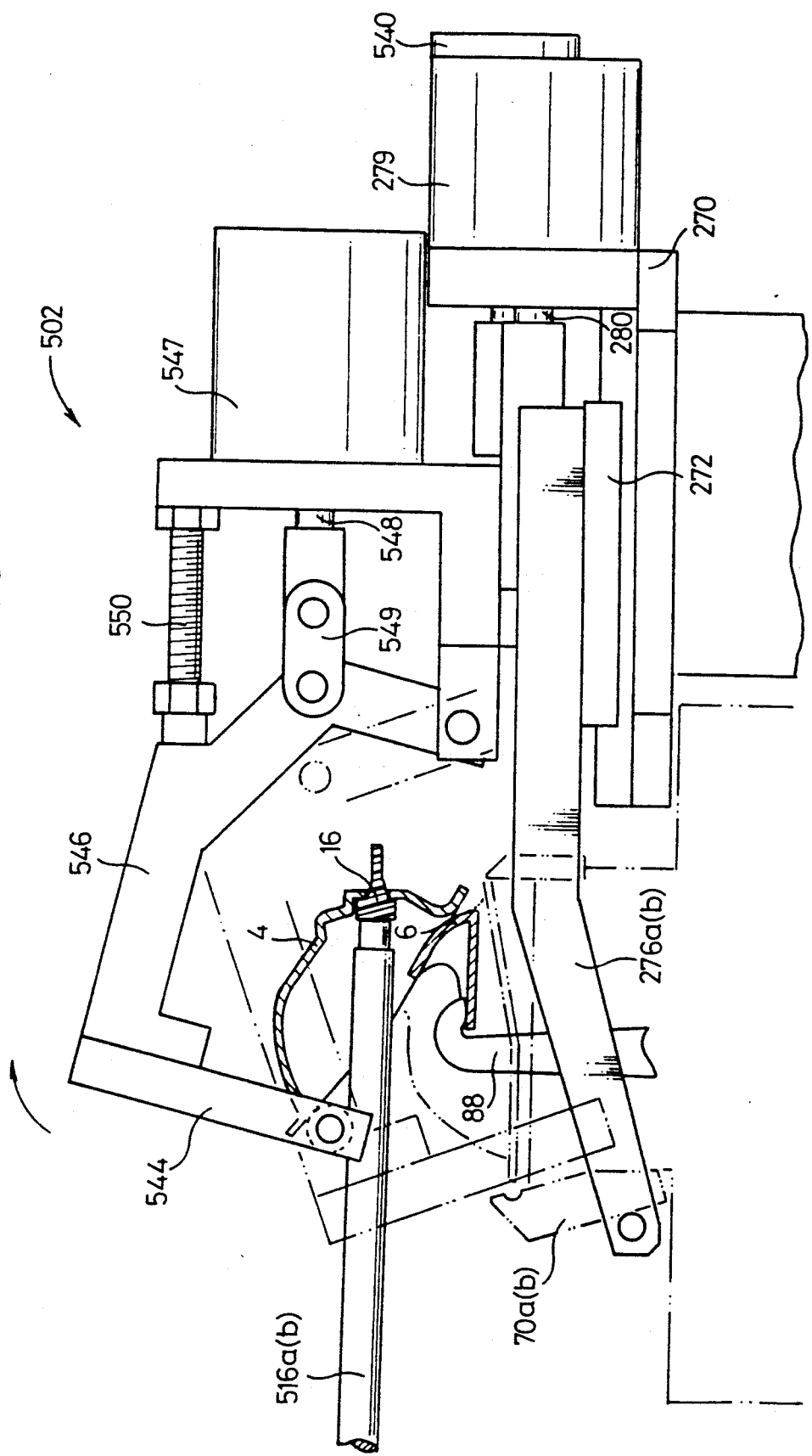
FIG. 33 is a side elevational view of the jig shown in FIG. 32.

The jig 502 shown in FIG. 32 has some common parts identical to those of the assisting jig 246 (FIG. 20) used in the fifth assembling station 45. Only those components which are unique to the jig 502 will be described below, whereas the common parts are denoted by identical reference characters and will not be described in detail.

A handle opening and closing mechanism 542 which is movable back and forth by a cylinder 540 includes a substantially C-shaped hand 544 for engaging opposite sides of the handle 6, and an angularly movable arm 546 coupled to the hand 544. The angularly movable arm 546 is coupled to the piston rod 548 of a cylinder 547 through a link 549. The handle opening and closing mechanism 542 also includes a stopper bolt 550 for stopping the arm 546.

The stoppers 16 are installed on the handle case 4 in the tenth assembling station 50 in the following manner.

When stoppers 16 are delivered from the non-illustrated parts feeder along the feed passage 504, as shown in FIG. 31, since the sockets 510a, 510b are initially positioned slightly lower than the position of the stoppers 16 thus delivered, the stoppers 16 are fitted respectively into the sockets 510a, 510b. At this time, the chuck bars 516a, 516b on the wrist 100 are in a standby position in engagement with the positioning plate 514, as shown in FIG. 31. As a result, by extending the piston rod 509 of the cylinder 508, the sockets 510a, 510b are elevated to cause the needles on the distal ends of the chuck bars 516a, 516b to pierce the stoppers 16 received respectively in the sockets 510a, 510b. The handling robot is then operated to move along a learned path to install the stoppers 16 on the handle case 4 as shown in FIG. 33. At this time, the jig 502 operates as follows:

The jig 502 is lowered from a position higher than the illustrated position of FIG. 33 by a lifting and lowering means (not shown) to bring the clamp release lever 278 supported on the distal ends of the arms 276a, 276b into a vertical position at the lower ends of the clamping members 70a, 70b of the pallet 54. Then, the piston rod 280 of the cylinder 279 is retracted to pull the arms 276a, 276b to move the clamp release lever 278 into engagement with the clamping members 70a, 70b to unclamp the handle case 4 from the clamping members 70a, 70b. Thereafter, a cylinder 540 is operated to move the handle opening and closing mechanism 542 forwardly to cause the hand 544 to engage the handle case 4. The piston rod 548 of the cylinder 547 is then retracted to turn the hand 544 in the direction of the arrow to open the handle case 4. The handle case 4 still remains clamped on the pallet 54 by the clamping lever 80.

While the handle case 4 is being opened, the handling robot brings the chuck bars 516a, 516b into a desired position within the handle case 4, and installs the stoppers 16 on the handle case 4.

All the assembling steps in the assembling stations 41 through 50 are now finished, and the completed door handle is produced.

Although a certain preferred embodiment has been shown and described, it should be understood that many changes and modifications may be made therein without departing from the scope of the appended claims.

What is claimed is:

1. A method of assembling a door handle, comprising the steps of:
   clamping a handle case and a handle which are substantially assembled on a pallet with respective first and second clamping means on said pallet, said first clamping means clamping said handle case downwardly on said pallet, said second clamping means clamping one end of said handle beneath said handle case such that another end of said handle to be connected to said handle case extends upwardly through said handle case;
   conveying said pallet along a looped conveyor;
   connecting said handle case and said handle operatively to each other with hinge means in a first assembling station disposed alongside of said conveyor; and
   thereafter conveying said pallet successively through other assembling stations disposed along said conveyor to install other door handle components on said handle case and said handle in said other assembling stations.

2. The method according to claim 1, wherein said other door handle components include a stopper to be installed in one of said other assembling stations, further including the steps of:
   releasing said first clamping means to unclamp said handle case while clamping said handle to said pallet with said second clamping means in one of said other assembling stations;
   thereafter, turning said handle case on said handle in said one of the other assembling stations; and
   inserting the stopper into said handle case in said one of the other assembling stations.

3. The method according to claim 1, wherein said hinge means comprises a pair of first and second coil springs and a pair of first and second hinge pins, further including the steps of:
   installing said first coil spring and said second hinge pin on said handle case and said handle in said first assembling station; and
   thereafter installing said second coil spring and said second hinge pin on said handle case and said handle in a next assembling station.

4. The method according to claim 3, wherein the steps of installing the first and second coil springs and the first and second hinge pins further comprise the steps of:
   inserting a first guide pin into a first set of pin holes defined in said handle case and said handle at said first assembling station, said first set of pin holes receiving said first hinge pin;
   positioning said first coil spring on said handle case and said handle;
   inserting said first hinge pin through said first set of pin holes while simultaneously removing said first guide pin therefrom;
   inserting a second guide pin into a second set of pin holes defined in said handle case and said handle at said next assembling station, said second set of pin holes receiving said second hinge pin;
   positioning said second coil spring on said handle case and said handle; and
   inserting said second hinge pin through said second set of pin holes while simultaneously removing said second guide pin therefrom.

5. The method according to claim 4 further comprising:
   rotating said first and second guide pins while inserting said guide pins through said first and second sets of pin holes.

* * * * *